US008352980B2

(12) United States Patent
Howcroft

(10) Patent No.: US 8,352,980 B2
(45) Date of Patent: Jan. 8, 2013

(54) SYSTEM AND METHOD FOR SINGLE SIGN ON TARGETED ADVERTISING

(75) Inventor: Jerald Robert Howcroft, Beverly Hills, MI (US)

(73) Assignee: AT&T Intellectual Property I, LP, Atlanta, GA (US)

(*) Notice: Subject to any disclaimer, the term of this patent is extended or adjusted under 35 U.S.C. 154(b) by 124 days.

(21) Appl. No.: 11/707,746

(22) Filed: Feb. 15, 2007

(65) Prior Publication Data
US 2008/0201731 A1 Aug. 21, 2008

(51) Int. Cl.
H04N 7/025 (2006.01)
G06Q 30/00 (2012.01)

(52) U.S. Cl. .......... 725/34; 725/22; 725/32; 725/35; 725/36; 725/46; 705/14.4; 705/14.41; 705/14.49; 705/14.52; 705/14.54

(58) Field of Classification Search ............ 705/14, 705/14.4, 14.41, 14.49, 14.52–14.55, 14.66–14.67; 725/9, 13, 22, 32, 34–36
See application file for complete search history.

(56) References Cited

U.S. PATENT DOCUMENTS

| 5,710,884 | A  | * | 1/1998  | Dedrick .................. 709/217 |
| 6,177,931 | B1 | * | 1/2001  | Alexander et al. ........... 725/52 |
| 6,236,978 | B1 | * | 5/2001  | Tuzhilin .................. 705/26 |
| 6,574,793 | B1 |   | 6/2003  | Ngo et al. |
| 6,698,020 | B1 | * | 2/2004  | Zigmond et al. ............. 725/34 |
| 6,804,659 | B1 | * | 10/2004 | Graham et al. ........... 705/14.49 |
| 7,155,508 | B2 | * | 12/2006 | Sankuratripati et al. ...... 709/224 |
| 7,334,251 | B2 | * | 2/2008  | Rodriguez et al. ............ 725/42 |
| 7,437,751 | B2 | * | 10/2008 | Daniels ................... 725/112 |
| 7,440,674 | B2 | * | 10/2008 | Plotnick et al. ............. 386/68 |
| 7,552,460 | B2 | * | 6/2009  | Goldman .................. 725/44 |
| 2001/0016818 | A1 | * | 8/2001  | Hara et al. ................ 704/500 |
| 2002/0042914 | A1 | * | 4/2002  | Walker et al. .............. 725/36 |
| 2002/0053084 | A1 | * | 5/2002  | Escobar et al. ............. 725/47 |
| 2002/0059387 | A1 | * | 5/2002  | Wolfe ..................... 709/206 |
| 2002/0087402 | A1 | * | 7/2002  | Zustak et al. .............. 705/14 |
| 2002/0120935 | A1 | * | 8/2002  | Huber et al. ............... 725/60 |
| 2002/0128908 | A1 | * | 9/2002  | Levin et al. ............... 705/14 |
| 2002/0160762 | A1 | * | 10/2002 | Nave et al. ................ 455/414 |
| 2003/0046189 | A1 | * | 3/2003  | Asayama .................. 705/27 |
| 2003/0078972 | A1 | * | 4/2003  | Tapissier et al. ........... 709/204 |
| 2003/0121040 | A1 | * | 6/2003  | Ferman et al. .............. 725/40 |
| 2003/0177504 | A1 | * | 9/2003  | Paulo et al. ............... 725/118 |
| 2004/0073915 | A1 | * | 4/2004  | Dureau ..................... 725/9 |
| 2004/0193488 | A1 | * | 9/2004  | Khoo et al. ................ 705/14 |
| 2004/0194131 | A1 | * | 9/2004  | Ellis et al. ................ 725/34 |
| 2004/0203630 | A1 | * | 10/2004 | Wang .................... 455/414.1 |
| 2004/0261100 | A1 | * | 12/2004 | Huber et al. ............... 725/32 |

(Continued)

Primary Examiner — An Son P Huynh
(74) Attorney, Agent, or Firm — G. Michael Roebuck

(57) ABSTRACT

A method is disclosed for sending targeted advertising data, the method including monitoring in a plurality of data communications networks, single sign on (SSO) subscriber event data from a first SSO subscriber end user device and a second SSO subscriber end user device, calculating product interest correlation scores in a plurality of advertising categories for an SSO subscriber advertising profile based on the monitoring SSO subscriber event data, selecting advertising data in at least one of the advertising categories from an advertiser database based on the SSO subscriber advertising profile, selecting a format to deliver the selected advertising data to a third SSO subscriber end user device and sending the targeted advertising data to the third SSO subscriber end user device. A system and a computer program are disclosed for performing the method. A data structure is disclosed for providing an interrelationship between a processor and data structure data.

10 Claims, 9 Drawing Sheets

U.S. PATENT DOCUMENTS

| | | | |
|---|---|---|---|
| 2005/0028208 A1* | 2/2005 | Ellis et al. | 725/58 |
| 2005/0137958 A1* | 6/2005 | Huber et al. | 705/37 |
| 2005/0149964 A1* | 7/2005 | Thomas et al. | 725/9 |
| 2005/0256766 A1* | 11/2005 | Garcia et al. | 705/14 |
| 2006/0013557 A1 | 1/2006 | Poslinski | |
| 2006/0041478 A1 | 2/2006 | Zheng | |
| 2007/0130010 A1* | 6/2007 | Pokonosky | 705/14 |
| 2007/0136753 A1* | 6/2007 | Bovenschulte et al. | 725/46 |
| 2007/0157114 A1* | 7/2007 | Bishop et al. | 715/787 |
| 2007/0157247 A1* | 7/2007 | Cordray et al. | 725/47 |
| 2007/0214470 A1* | 9/2007 | Glasgow et al. | 725/10 |
| 2007/0244750 A1* | 10/2007 | Grannan et al. | 705/14 |
| 2007/0265073 A1* | 11/2007 | Novi et al. | 463/35 |
| 2008/0016232 A1* | 1/2008 | Yared et al. | 709/229 |
| 2008/0086747 A1* | 4/2008 | Rasanen et al. | 725/46 |
| 2008/0155585 A1* | 6/2008 | Craner et al. | 725/32 |
| 2008/0189742 A1* | 8/2008 | Ellis et al. | 725/39 |
| 2008/0235351 A1* | 9/2008 | Banga et al. | 709/218 |

* cited by examiner

US 8,352,980 B2

SYSTEM AND METHOD FOR SINGLE SIGN ON TARGETED ADVERTISING

FIELD OF THE DISCLOSURE

The present disclosure provides a system and method for delivering targeted advertising data in a communications network.

BACKGROUND

Targeted advertising selects an advertisement and sends the advertisement to selected individuals who are targeted to receive the advertisement. Advertisers can potentially save advertising dollars by selecting who will receive their advertisements rather than indiscriminately broadcasting their advertisements to a general population of recipients. Thus, only those individuals selected by an advertiser receive the targeted advertisement in hope that the targeted recipients will be more responsive on a per capita basis than a general broadcast population. Advertisement distributors and providers that enable such an advertising model (e.g. Internet portals, television providers, access network providers) can correspondingly increase their revenue per advertisement impression by providing targeted advertising options for advertisers.

BRIEF DESCRIPTION OF THE DRAWINGS

For detailed understanding of the illustrative embodiment, references should be made to the following detailed description of an illustrative embodiment, taken in conjunction with the accompanying drawings, in which like elements have been given like numerals.

DETAILED DESCRIPTION

Figure 1:
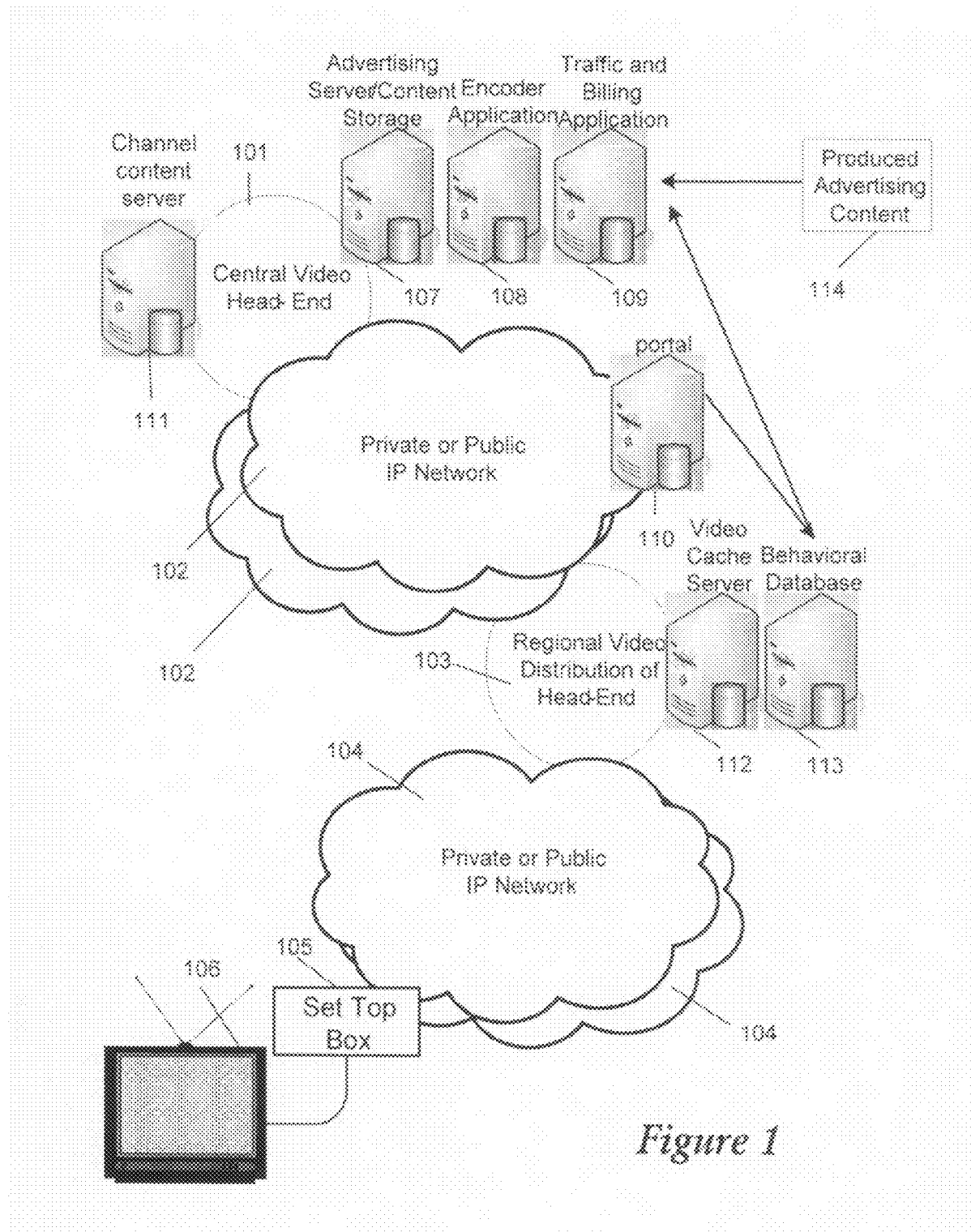
FIG. 1 is a high level block diagram depicting an illustrative embodiment of a system and method for selecting targeted advertising data for single sign on (SSO) end user devices.

In an illustrative embodiment a method is disclosed for sending targeted advertising data, the method including monitoring in a plurality of data communications networks, single sign on (SSO) subscriber event data from a first SSO subscriber end user device and a second SSO subscriber end user device, calculating product interest correlation scores in a plurality of advertising categories for SSO subscriber advertising profile data based on the monitoring SSO subscriber event data, selecting advertising data in at least one of the advertising categories from an advertiser database based on the SSO subscriber advertising profile data, selecting a format to deliver the selected advertising data to a third SSO subscriber end user device and sending the targeted advertising data to the third SSO subscriber end user device.

In another illustrative embodiment of the method, the plurality of data communications networks are selected from the group consisting of an internet protocol television network, a voice over internet protocol network, an internet service provider network and a cellular telephone network. In another illustrative embodiment of the method, the SSO subscriber event data indicates at least two events from two different platforms selected from the group consisting of selecting a television station, selecting an interactive television menu option, selecting content for an internet protocol (IP) end user device, accessing a resource indicated by a uniform resource indicator (URI), browsing a web site, creating a user profile, carrying out a digital purchase transaction, internet chatting, internet blogging, placing a telephone call, sending an instant message, receiving an instant message, receiving an email, and sending an electronic mail message.

In another illustrative embodiment of the method the first SSO subscriber end user device is selected from the group consisting of a cell phone, personal digital assistant (PDA), lap top computer, stationary personal computer, IPTV remote control, web tablet, laptop computer, pocket PC, a television set capable of receiving IP based video services and mobile IP device, the second SSO subscriber end user device is one selected from a group consisting of a cell phone, personal digital assistant (PDA), lap top computer, stationary personal computer, IPTV remote control, web tablet, laptop computer, pocket PC, a television set capable of receiving IP based video services and mobile IP device, and the third SSO subscriber end user device is one selected from a group consisting of a cell phone, personal digital assistant (PDA), lap top computer, stationary personal computer, IPTV remote control, web tablet, laptop computer, pocket PC, a television set capable of receiving IP based video services and mobile IP device.

In another illustrative embodiment of the method, the SSO subscriber advertising profile further comprises a shopping list of products selected by an SSO subscriber associated with the SSO subscriber advertising profile. In another illustrative embodiment the method further includes determining a characteristic for the third SSO subscriber end user device and adapting an advertising data format for the third SSO subscriber end user device to at least one of the group consisting of audio, video, graphics support, and text fidelity to match the characteristic of the third SSO end user device. In another illustrative embodiment of the method, the third end user device is selected based on device response tendency data from the SSO subscriber advertising profile.

In another illustrative embodiment of the method, sending further comprises sending targeted advertising data having a data type selected from the group consisting of image, video, audio, text and icon, wherein the data type is selected based on an SSO end user data type response tendency data from the SSO subscriber advertising profile. In another illustrative embodiment of the method, the SSO end user data is collected from a plurality of different hardware and software platforms having different SSO subscriber identifiers associated with the SSO end user identifier. In another illustrative embodiment a system is disclosed for sending targeted advertising, the system including a processor in data communication with a computer readable medium and a computer program stored in the computer readable medium for execution by the processor, the computer program comprising instructions to monitor in a plurality of data communications networks, SSO subscriber event data from a first SSO subscriber end user device and a second SSO subscriber end user device, instructions to calculate product interest correlation scores in a plurality of advertising categories for SSO subscriber advertising profile data based on the monitoring SSO subscriber event data, instructions to select advertising data in at least one of the advertising categories from an advertiser database based on the SSO subscriber advertising profile data, instructions to select a format to deliver the selected advertising data to a third SSO subscriber end user device and instructions to send the targeted advertising data to the third SSO subscriber end user device.

In another illustrative embodiment of the system, the plurality of data communications networks are selected from the group consisting of an internet protocol television network, a voice over internet protocol network, an internet service provider network and a cellular telephone network. In another illustrative embodiment of the system, the SSO subscriber event data indicates at least two events selected from the group consisting of selecting a television station, selecting an interactive television menu option, selecting content for an internet protocol (IP) end user device, accessing a resource indicated by a uniform resource indicator (URI), browsing a web site, creating a user profile, carrying out a digital purchase transaction, internet chatting, internet blogging, placing a telephone call, sending an instant message, receiving an instant message, receiving an email, and sending an electronic mail message. In another illustrative embodiment of the system, the first SSO subscriber end user device is selected from the group consisting of a cell phone, personal digital assistant (PDA), lap top computer, stationary personal computer, IPTV remote control, web tablet, laptop computer, pocket PC, a television set capable of receiving IP based video services and mobile IP device, the second SSO subscriber end user device is one selected from a group consisting of a cell phone, personal digital assistant (PDA), lap top computer, stationary personal computer, IPTV remote control, web tablet, laptop computer, pocket PC, a television set capable of receiving IP based video services and mobile IP device, and the third SSO subscriber end user device is one selected from a group consisting of a cell phone, personal digital assistant (PDA), lap top computer, stationary personal computer, IPTV remote control, web tablet, laptop computer, pocket PC, a television set capable of receiving IP based video services and mobile IP device.

In another illustrative embodiment of the system, the SSO subscriber advertising profile further comprises a shopping list of products selected by an SSO subscriber associated with the SSO subscriber advertising profile. In another illustrative embodiment of the system, the computer program further comprising instructions to determine a characteristic for the third SSO subscriber end user device and instructions to adapt an advertising data format for the third SSO subscriber end user device to at least one of the group consisting of audio, video, graphics support, and text fidelity to match the characteristic of the third SSO end user device. In another illustrative embodiment of the system, the third end user device is selected based on device response tendency data from the SSO subscriber advertising profile.

In another illustrative embodiment of the system, the instructions to send further comprise instructions to send targeted advertising data having a data type selected from the group consisting of image, video, audio, text and icon, wherein the data type is selected based on an SSO end user data type response tendency data from the SSO subscriber advertising profile. In another illustrative embodiment of the system, the SSO end user data is collected from a plurality of different platforms having different SSO subscriber identifiers associated with the SSO end user identifier. In another illustrative embodiment, a computer readable medium containing a computer program is disclosed for execution by a processor useful for sending targeted advertising data, the computer program comprising instructions to monitor in a plurality of data communications networks, single sign on (SSO) subscriber event data from a first SSO subscriber end user device and a second SSO subscriber end user device, instructions to calculate product interest correlation scores in a plurality of advertising categories for SSO subscriber advertising profile data based on the monitoring SSO subscriber event data, instructions to select advertising data in at least one of the advertising categories from an advertiser database based on the SSO subscriber advertising profile data, instructions to select a format to deliver the selected advertising data to a third SSO subscriber end user device and instructions to send the targeted advertising data to the third SSO subscriber end user device.

In another illustrative embodiment of the medium, the computer program, the data communications network is selected from the group consisting of an internet protocol television network, a voice over internet protocol network, an internet service provider network and a cellular telephone network. In another illustrative embodiment a data structure embedded in a computer readable medium is disclosed, the data structure including a first field for storing data indicating a single sign on (SSO) identifier for a plurality of SSO subscriber identifiers and a second field for storing data indicating an SSO subscriber advertising profile for the SSO identifier. In another illustrative embodiment of the data structure, the data structure further includes a third field for storing data indicating an SSO end user device type response tendency for the SSO identifier. In another illustrative embodiment of the data structure, the further includes a fourth field for storing data indicating a data type response tendency for the indicated SSO end user device type.

In an illustrative embodiment a single sign on (SSO) end user (or subscriber) in a data communications network. The data communications network in the present example is a triple play network including a plurality of data communications networks (also referred to as "networks") and platforms including but not limited to an IPTV network, VoIP network, Cellular Phone network and Internet Service provider network. In a particular illustrative embodiment, each platform and network uses a separate and distinct SSO subscriber identifier to identify a single SSO subscriber. Thus, a multiplicity of platform and network identifiers are used to represent a single SSO subscriber on the networks and platforms. In an illustrative embodiment, an SSO subscriber identifier is provided so that the single SSO identifier can be used on all the network and platforms to represent the SSO subscriber instead of the multiple platform identifiers and network identifiers. The SSO subscriber is able to input a shopping list of desired products for which they are currently shopping and forward this information to the advertising insertion behavioral database associated with the targeted advertising management system (TAMS) to be used for selection of triple play or 3 screen advertisements to be sent to the end user (customer specified advertising targeting) on one or more triple play devices (IPTV, cell phone, mobile IP device). The SSO end user is tracked across different platforms and data communication networks using a single sign on (SSO) identifier. The SSO serves as a single SSO subscriber identifier that can be used for each portal platform and network. The SSO identifier is useful on multiple if not all platforms and networks. Recent portal search information is added into the end user's advertising insertion behavioral database and SSO end user profile (based on monitoring and characterizing data communications in the triple network) to be used for updating the SSO end user profile useful for targeted advertising selection. The targeted advertising management system (TAMS) monitors SSO end user communications data in the triple play network, as SSO subscriber event data based on the SSO identifier and continuously updates the SSO end user profile in the behavioral database.

The end user's triple play behavioral data on the plurality of networks and platforms and SSO end user profile data based on the behavioral data is accessible by a triple play service provider. That is, a service provider will have access to SSO end user activity data, along with the SSO subscriber personalization capabilities, and the additional advertising insertion methods available on the IPTV STB platform and all other SSO end user devices (cell phones, PCs, etc.) such as VOD advertising insertion and long form banner and pop-up advertising insertion on the IPTV home page, will enable a competitive advantage in targeting advertising that will increase the value of advertisement to SSO subscribers.

In an illustrative embodiment, a system and method enable triple play service providers to insert new targeted advertising or copy over the advertising that the IPTV linear channel content providers included in their programming (given the content providers permission to copy). As a service provider acquires more IPTV subscribers, this will enable service providers to increase their targeting of these advertisements. In the current illustrative example, the IPTV network includes a plurality of data communications networks, platforms and services for IPTV, VoIP, Internet data and cellular telephone data.

As the IPTV and advertising insertion projects mature, service providers will move down the inventory hierarchy from targeting service provider's IPTV consumers based on channels or programs to targeting based on more detailed end user "psychographic" information that may be collected by the service provider. Psychographic information is derived from an end user's SSO subscriber advertising profile, which includes demographic data and response tendency data associated with data type and advertising type. The SSO subscriber advertising profile is discussed in more detail below. The SSO subscriber advertising will enable service providers to move to a direct marketing strategy of targeted advertisement. The ultimate goal is to provide the SSO subscribers on a triple play network with more relevant advertisement data on multiple end user devices, therefore improving their IPTV experience while at the same time maximizing the IPTV service provider's value to their targeted advertising insertion business customers. In an illustrative embodiment, a platform describes some sort of framework, either in hardware or software, which allows software to run. Typical platforms include a computer's architecture, operating system, or programming languages and their runtime libraries. A separate subscriber identifier is used to authenticate a subscriber to allow the subscriber to access each platform. An SSO subscriber identifier allows access to all platforms.

Search information may be used on internet search sites such as GOOGLE™ to provide related banner advertisements and sponsored search results. The illustrative embodiment may enable the search information to be used for targeting advertisements to the end user's television/STB as well as other end user screens such as personal computers, mobile IP devices and cell phones. Other internet activity may also be used for the advertising targeting such as visited uniform resource indicators (URIs) visited by SSO subscribers using SSO end user devices.

In another illustrative embodiment the explicit entering of a "shopping list" or list of products in which the SSO subscriber is interested, from the end user's PC on their portal is enabled so the end user may specify what types of advertisements they would like to receive on all of their service provider's services (all screens (IPTV, cell phone and web portal to the internet)).

In another illustrative embodiment, a system and method are provided to enhance triple play or 3 screen advertising (IPTV display screen, mobile or stationary personal computer display screen, cellular telephone display screen) targeting by collecting more specific information regarding products and services for which the end user is currently shopping. Response tendency data for data type, advertising type and end user device type is collected and stored in the data base and data structure. SSO subscriber response tendency data are stored indicating response tendencies for data type of advertising to which an SSO subscriber responds (e.g., image, video, audio, text, icon), response tendencies for advertising type to which an SSO subscriber responds (banner, pop up) and response tendencies for which device type to which an SSO subscriber responds (IPTV display, personal computer, cellular telephone, or other end user device). An illustrative embodiment allows an end user to be more specific to the service provider as to what they are shopping for by entering their shopping list of desired products and/or services or other interests into an online tool such as their SSO subscriber portal. In a particular illustrative embodiment, the shopping list data is stored in the SSO subscriber advertising profile.

For example, if an SSO end user enters their shopping list data via the online portal indicating that they are currently shopping for a pickup truck, this shopping list data information may be prioritized within the behavioral database to send targeted pickup truck advertisement data to the end user's television (linear advertising insertion, VOD advertising insertion), cellular phone, and PC (banner advertisements). In an illustrative embodiment an SSO end user's responsiveness to particular data type (image, audio, video, text), advertising types (banner, pop-up, icon indicated) and end user device type (IPTV display, cell phone, personal computer, mobile laptop, etc.) is tracked and stored in a data structure associated with the SSO end user profile indicating data type response tendency, advertising type response tendency and device type response tendency.

Another particular illustrative embodiment includes collecting specific information regarding products and services for which an SSO subscriber is looking by characterizing SSO end user event data, the event data for a multiplicity of networks and platforms and end user devices associated with a SSO subscriber identifier including but not limited to internet search history, and anonymous reverse look-up of telephone numbers (by SSO subscriber election only) dialed in the VoIP or Cellular telephone system, chat message text, etc.) into an end user's SSO subscriber behavioral database.

The SSO subscriber behavioral database information may then be used to select targeted advertisement data types, advertisement types and device types for the SSO subscriber. For example, if a SSO subscriber enters a search for the GM Sierra pick-up, this information may be added to the SSO subscriber's database so that television advertisements may be sent to the SSO subscriber regarding pick-up trucks or related products. The IPTV service provider network may then target specific advertising via specific user profile.

The illustrative embodiment allows for real-time targeted advertising based upon an SSO subscriber's identified preferences as they have entered them under a "shopping list" or based on their internet behavior. The illustrative embodiment provides a process of targeted advertising across an IP network to an IPTV end user based on this behavioral information provided by their portal. This method may increase the relevance of advertisements to the SSO subscriber, which will increase the SSO subscriber's interest in watching the advertisements and therefore increase the value of the advertisements to the advertiser.

Turning now to FIG. 1, FIG. 1 is an illustrative embodiment of an IPTV architecture providing a plurality of data communications networks offering a triple play network to support behavioral targeted advertising. The IPTV triple play architecture includes but is not limited to an integrated IPTV network, cellular network, and data including VoIP network. As a SSO subscriber views the television 106 across an STB 105 data is collected at the behavioral database 113. In an illustrative embodiment the SSO subscriber is able to specify their shopping list from their PC on the internet and logon to their portal 110 where may enter their shopping list and SSO subscriber information. Their SSO logon information is logged into the behavioral database 113. The TAMS accesses the SSO subscriber behavioral database and SSO subscriber advertising profile to use in selecting targeted advertising. Once the SSO end user device and associated SSO subscriber is authenticated to the portal the SSO subscriber uses the SSO end user device to enter various URIs or use the portal's search engine or an alternate search engine such as GOOGLE TM to enter internet search criteria to browse the World Wide Web. This search information is also logged into the behavioral database 113. The behavioral database communicates the end user's behavioral information to the traffic and billing system 109 so the information may be used to sell and schedule linear video content advertisement data 114. The advertisement data are encoded 108 and stored on the advertising content server 107. The advertisements are spliced into the linear video content served up from the linear video content servers 111 and sent to the end user's STB 105 for viewing on their television 106. The behavioral database information may also be used for advertising targeting to other screens such as cell phones and mobile IP devices and PCs. The IPTV behavioral advertising insertion model mentioned within this application are comprised of several subcomponents referenced in FIG. 1. A federated type single sign on (SSO) mechanism is provided by the customers' portal and IPTV service, as well as other data communications networks and platforms, may provide for maintenance of state to personalize the SSO subscriber's cross platform and cross network advertisements to their cross platform/network behavior provided by system and method in an illustrative embodiment.

SSO subscriber event data from monitoring SSO data communications in the plurality of platforms and networks including the triple play network or IPTV network include image, video, text, audio and icon data and associated image, video, text, audio and icon data recognition systems for characterizing the SSO subscriber event data. The SSO subscriber communicates with the TAMS using an SSO subscriber end user device which can include but is not limited to a cell phone, personal computer, PDA, computer mouse, or IPTV receiver and input device, such as a remote control. An illustrative system includes a processor 130 coupled to memory 132 and database 134 in memory. A computer readable medium containing instructions that can be executed by the processor is embedded in the memory.

In an illustrative embodiment the system and method monitor and compile an SSO subscriber's event data including but not limited to current session and the device characteristics of the end user device being used to access IP-based services over a plurality of networks and platforms such as an IPTV network, along with previous usage history to assist service providers and advertisers in evaluating the potential appeal of their services and advertisements to the particular SSO subscriber. The SSO subscriber can use any end user device to interact with the IPTV network to access content, services and applications. The IP network may include but is not limited to a combination of an IPTV network, VoIP network, cellular telephone network, WiMax, WiFi and may access a public switched telephone network (PSTN).

Figure 2:
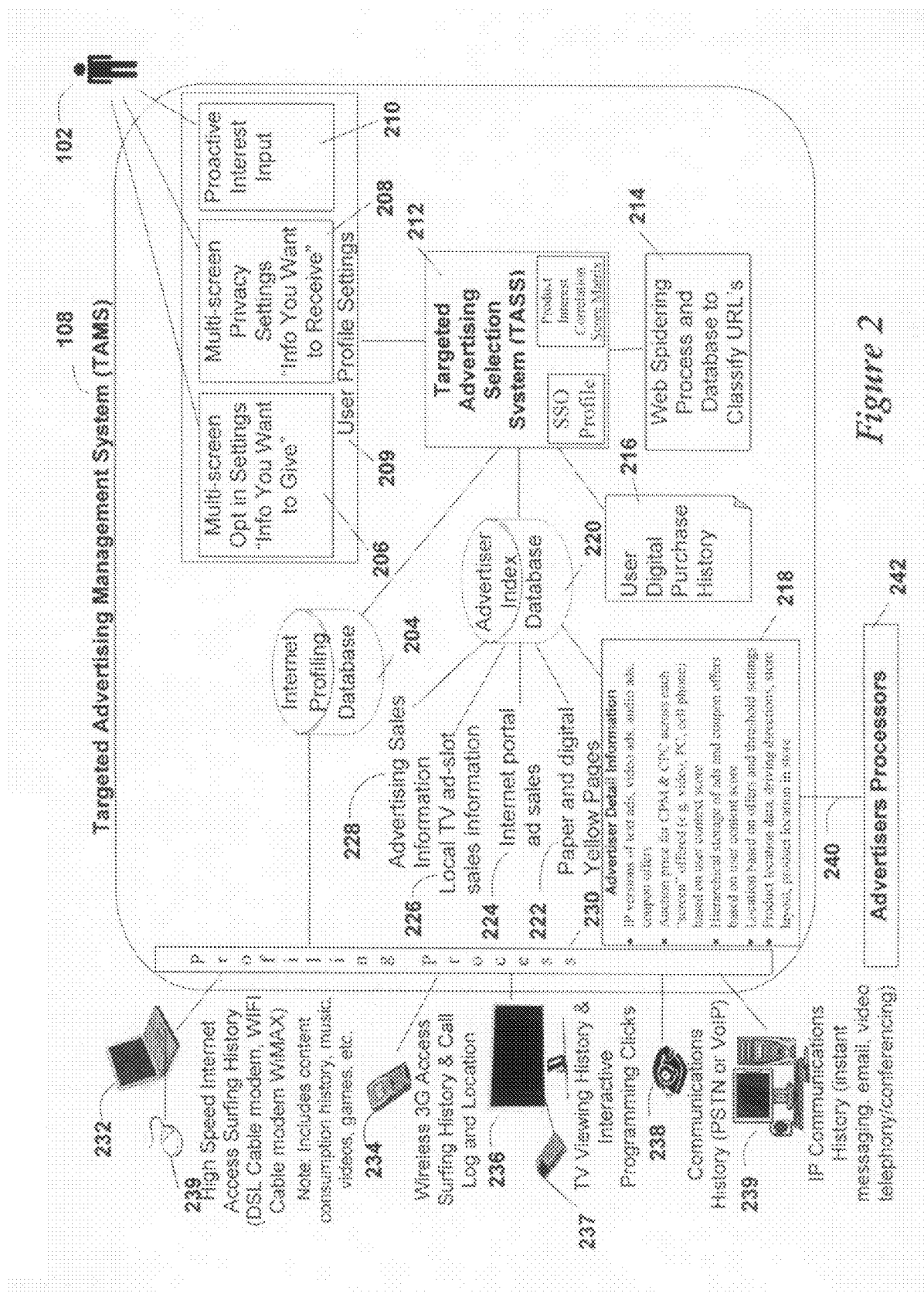
FIG. 2 is a block diagram of system components in an illustrative embodiment of a system for determining which advertisement data are targeted to a SSO subscriber, in an illustrative embodiment.

Turning now to FIG. 2, in an illustrative embodiment the system and method accesses the advertisements database 220 to select a targeted advertisement to send to the SSO subscriber. An illustrative system and method 108 automatically calculates a product interest correlation score (PICS) and recommends and/or selects an advertisement, SSO end user device and advertisement modality to be used to send a selected advertisement to a selected SSO subscriber end user device based on the SSO subscriber's current usage scenario. An SSO subscriber usage scenario includes but is not limited to an SSO subscriber's current end user device, location and activity (e.g., watching a particular show over an IPTV network, web surfing, gaming, talking on a phone, chatting on the internet, etc.).

For example, if an SSO subscriber has a PICS higher than a PICS threshold set by an advertiser for a product category in an illustrative embodiment TAMS system and method can select and send an advertisement in the product category formatted suitably for reception on the SSO subscriber's cell phone (end user device) as the SSO subscriber drives near one of the advertiser's merchant physical locations. The SSO subscriber's location can be tracked by a global positioning system (GPS), cell tower proximity or triangulation or WiFi hot spot proximity based on the user's cell phone, laptop computer or other end user device and factored into the bid price by the advertiser. Alternatively, the user's current location, activity, and correlation scores for advertising categories may be used to select and queue up an advertisement for delivery later through a different end user device. For example, a merchant who is in the vicinity of an SSO subscriber's recent location may choose to send a 30-second television commercial, which cannot be accommodated on the SSO subscriber's current portable end user device. The commercial can be queued for delivery once the SSO subscriber is at home watching television rather than immediately sending an advertisement to the SSO subscriber's cell phone.

For example, in an illustrative embodiment a PICS may range from 1 to 100. An advertiser may set a PICS threshold of 20 for sending a text advertisement to an SSO subscriber's cell phone, a PICS threshold of 50 for sending a video advertisement to the SSO subscriber's cell phone and set a PICS threshold of 90 for sending a video advertisement to the SSO subscriber's IPTV receiver. In another particular illustrative embodiment, the PICS threshold and product interest correlation score is also weighted by SSO subscriber response tendencies for advertising type, data type and end user device type.

FIG. 2 is a block diagram 200 depicting informational components that are used by and integrated into the TAMS 108 in an illustrative system and method. In an illustrative embodiment, the TAMS 108 aggregates, collates and mines surfing and content (music, television, movies, audio books, etc.) consumption data across multiple end user devices platforms and network end user devices and mechanisms (e.g., including but not limited to, IPTV, wireless 3G, high speed Internet access), coordinating the information tightly with SSO subscriber opt-in preferences, to create a highly targeted and contextualized advertising system for SSO subscribers of IP-based services (including but not limited to, IPTV, VoIP, email, SMS, mobile calling, web surfing, instant messaging (IM), chatting, blogging, and mobile computing, etc.).

An Internet profiling process 230 monitors an SSO subscribers' end user devices event data used to access the platforms and networks and stores the access event devices data in an Internet profiling database 204. The end user devices include but are not limited to telephones 238 calling via a public switched telephone network (PSTN) or connected over a VoIP network, remote controls for television viewing selections and interactive programming clicks or menu selections 236, cell phones 234 using 3G access for accessing the Internet and calling and personal computers/lap top computers and other IP devices 232 using high speed Internet access for web browsing, SMS, IM, email, chatting, text messaging, etc. Location information 235 obtained during the SSO subscribers' use of mobile and/or portable Internet devices is also provided to the Internet profiling process 230. Given that an SSO subscriber has "opted in" to allow being monitored for some or all of the information available through the Internet profiling process 230, the Internet profiling process 230 monitors the end user devices event data associated for the SSO subscriber's communications including outgoing calls, telephone numbers called, Internet access surfing history, content consumption, music, videos and games, IM, text messaging, chatting, and locations of an SSO subscriber, etc. The Internet profiling process may monitor digital or analog electronic activity of the SSO subscriber to store in the SSO subscriber advertising profile 209 and calculate a PCIS in an advertising, product or service category for the SSO subscriber based on the monitored event data.

An advertiser index database 220 stores data indicating advertising sales information 228, local television ad-slot sales information 226, Internet portal advertising sales 224, paper and digital yellow pages sales and advertiser detail information 218. The ad-slot sales information may include times in which available advertising spots are available and in what medium, for example IPTV, IP radio, cell phone, web page banner advertisements, etc. The advertiser detail information 218 includes but is not limited to IP versions of text advertisements data, video advertisements, audio advertisements and coupon offers. The advertising detail information data further includes but is not limited to auction prices for cost per thousand (CPM), cost per hundred (CPC), and cost per one (CPO) data for each end user device display or "screen" offered for advertising, e.g., video, personal computer, and cell phone screens based on time slot and SSO subscriber product interest correlation score data in a designated product data category. The advertising detail information further includes but is not limited to hierarchical storage of advertisements and coupon offers based on SSO subscriber PICS data and SSO subscriber context score data in a product category. Audio advertisements can be sent to SSO subscriber cell phones or mobile IP devices as recorded messages and video, audio, text and email advertisements can be sent to SSO subscriber cell phones, PDAs, lap top computers and other mobile digital devices capable of receiving data.

The advertising detail information data further includes but is not limited to location based advertisements data and a product interest correlation score threshold data settings. The location data may include but is not limited to a distance from an advertiser location within which an SSO subscriber will be sent an advertisement for the location. The advertising detail information data further includes but is not limited to product location data, driving directions data to the nearest merchant physical location (or store) having the product in stock, product inventory data for that location and layout data for the merchant physical location having the product in stock and location data within the merchant physical location layout at which the product is located indicating where to find the product in the merchant physical location (e.g., "aisle 12").

Targeted advertisement data can be sent to an SSO subscriber end user device, e.g., cell phone, PC or IPTV receiver. The advertisement can include a menu button for selection by an SSO end user device to see if a product is in stock and where the product is located in a store having a product in stock. These advertising selections are tracked and stored in the SSO subscriber advertising profile for accumulation of response tendency data for data type, device type and advertising type.

The location of the product in the store can be based on the product uniform product code (UPC) data and digital store inventory data provided by the advertiser. Coupons for the product can be sent along with the advertisement which can be displayed at the store or can be represented by a coupon code sent to the end user device that can be presented at the time of purchase to validate the coupon and receive a discounted price or other offer associated with the coupon and advertisement. The SSO subscriber may also have the option of completing the purchase digitally using the eWallet, so the item is ready for pick-up at the retail outlet when they arrive. In such an instance the SSO subscriber's user eWallet and digital purchase history 216 in the TAMS would be updated accordingly. The digital purchase history includes eWallet purchases, SSO subscriber purchases reported by merchants or monitored by the Internet profiling process and purchase information imported from another network.

Once an SSO subscriber enters a mall or store an advertiser can send video or hierarchical graphical displays to an SSO subscriber cell phone or other mobile device guiding the SSO subscriber through shopping and locating products at the store or mall. An advertiser may provide a shopper's assistant software agent in which an SSO subscriber may be guided by asking questions (using textual verbal entry through an automatic voice response system powered by the TAMS and advertising processor using data from the advertiser information data) of the software agent to guide the SSO subscriber through a shopping experience in the store or mall. A user may enter additional products via a selection menu presented by an advertisement sent to an SSO subscriber's mobile end user device to locate the products in the store or mall.

Advertiser processors 242 may send and receive data to and from and interact with the advertiser detail information data 218 via interface 240. Interface 240 which may be any digital or electrical interface for sending and receiving messages and data between an advertiser processor 242 and the advertiser detail information 218 data storage. The advertiser index database 220 is in communication with the targeted advertising selection system (TASS) 212. The TASS also communicates with the Internet profiling database 204, a SSO subscriber's digital purchase history 216, and a web spidering process that classifies URIs 214, SSO subscriber intent and user (subscriber) settings. In an illustrative embodiment the web spidering process visits each URI visited by an SSO subscriber and assesses the SSO subscriber's intent in visiting the URI. Web spidering, otherwise known as web crawling, browses the World Wide Web in a recursive, automated manner by starting with a list of URIs to visit, and then checking for hyperlinks at each URI and visiting those also. In an illustrative embodiment, the web spidering process 214 parses the text on each web page visited by an SSO subscriber and infers product category interest intent for an SSO subscriber visiting the web page for one or more advertising categories.

In an alternative embodiment, instead or in addition to the web spidering system, a web proxy may be introduced between the SSO subscriber end user device and a server to monitor and capture, URIs and URI data accessed by any one of the SSO subscriber end user devices used by the SSO subscriber. A processor within the proxy or connected to the proxy will use this data to classify and categorize online events. Such URI data may include responses from the URI to the SSO subscriber including but not limited to purchase transactions, content including video, audio and text and messaging interactions. The URIs and URI data is cached, stored and classified/categorized and indexed with Meta data added by the spidering system or proxy.

Proxy manifestations include but not limited to a variety of proxy types (stateful or stateless) may be used for this purpose, including but not limited to a traditional web HTTP proxy/intermediary/gateway. The proxy may further function as a, but not limited to the following, simple object access protocol (SOAP) proxy, a caching proxy, a transcoding proxy (content translation, media conversion, etc.), a session initiation protocol (SIP) proxy for multimedia sessions, an OMA Push proxy, wireless applications protocol (WAP) proxy or a proxy acting as a firewall, network/application filter, providing network address translation (NAT) and other security functions such as border control. In an illustrative embodiment the proxy sits in between a client and server and can act as a client as well as server depending on its functions.

The PICS for such categories is then weighted appropriately for the SSO subscriber advertising profile to reflect this interest. The SSO subscriber advertising profile setting includes but is not limited to SSO subscriber advertising profile data and user profile settings data 206, 208 and 210. SSO subscriber advertising profile data includes but is not limited to ages, family size, ethnicity, language spoken, address, SSO subscriber user identifiers for family members, etc. SSO subscriber advertising profile settings may also include but are not limited to multiple screens or device opt-in settings for selecting SSO end user devices through which an SSO subscriber 102 is willing to allow advertising to be received 208. SSO subscriber advertising profile settings may also include a shopping list of desired products and services, privacy (opt-in) settings defining specifically what categories of advertising may be received, and in what format 208. SSO subscriber advertising profiles may also include proactive product interest input 210 provided by an SSO subscriber. The web spidering process described herein is for example only and not intended to limit the scope of the disclosure as a number of different spidering or assessment techniques can be utilized as well as a number of different methods for assessing an SSO subscriber's intent by analyzing and assessing an SSO subscriber's web surfing URIs visited, telephone numbers called, IM and other activities, all of which are included herein under the term "spidering".

Advertisers can place advertisements in multiple media and formats, including text only, audio, HTML, and video that can be rendered to multiple end user devices used by the SSO subscriber as appropriate. Several criteria are used to determine advertisement placement or delivery and delivery timing for SSO subscribers. The criteria for determining advertisement placement or selection and delivery to an SSO subscriber can include but are not limited to location data, product interest correlation score data, current usage scenario (e.g., watching an IPTV show, listening to internet radio, playing a game, driving near a product advertiser physical location) and time of day. For example, an advertiser may place an auction bid for a price to send a text message advertisement to cell phones to reach the first 2000 14-18 year old boys between 5 and 9 pm on weekends who are within 5 miles of a shopping mall location having a product interest correlation score for a particular video game exceeding a product interest correlation score threshold of 50.

In another example, an advertiser may want to send an IPTV video advertisement on SSO subscriber IPTV displays for a Karaoke machine during showing of a television show, e.g., American Idol to everyone that is watching American Idol on IPTV (live or in replay) and that called in (or sent a text message) to vote on an American Idol contestant and have a product interest correlation score in a product category greater than a product interest correlation score threshold of 90. Other people watching American Idol who called in to vote and having a product interest correlation score greater than 50 and less than 90 could be sent a text advertisement on their IPTV display for the Karaoke machine.

Product interest correlation scoring aggregates weighting and scoring for web surfing history, behaviors and context across multiple devices including more detailed knowledge of what transactions/interests were actually conveyed by SSO subscriber web surfing and behavior. A web spidering (spidering) system matches SSO subscriber accessed URIs anonymously with an SSO subscriber's inferred intent by way of checking a dynamic database of URIs for specific sites that have been compiled through the web spidering process 214. The illustrative embodiment provides a classification system that schedules and conducts a web spidering procedure, in which procedure, web sites are scanned and specific URIs that have been visited by an SSO subscriber are categorized based on perceived or inferred intent of anyone accessing the URI, by using, e.g., natural language parsing and processing techniques. For example, the spidering system can anonymously ascertain that not only did an SSO subscriber visit a car manufacturer's web site to look at cars; the SSO subscriber actually looked at the product page for a particular model in detail and requested mailing of a product brochure. The SSO subscriber's inferred intent (in this case purchasing a Toyota Camry) derived by the web spidering system increases the SSO subscriber's product interest correlation score for a product category for Toyota Camry.

Auction-based advertising across multiple screens or end user devices based on a correlation or comparison of the advertisement product category with the product interest correlation score for the product/service for a particular SSO subscriber allows advertisers to tightly control and select what degree of advertisement contact should be made with an SSO subscriber (e.g., one to one TV advertisement, text message to phone) and what price contacting that SSO subscriber with an advertisement is worth. For example, in an example of contextual information, a person who has already received a video one to one TV advertisement may be sent a lower cost text advertisement as a reminder rather than paying to send another higher price video advertisement to the SSO subscriber. Once an advertisement type has been selected for the selected advertisement type in a given product category for an SSO subscriber or a group of SSO subscribers, auction based advertisements can be based on interactive bids between competing advertisers.

SSO subscriber-defined product and service interests along with privacy settings enable SSO subscribers to control what information they are willing to have monitored and used by the TAMS 108 for targeting advertisements to them, and what information they are willing to receive (e.g., on which end user devices, from which advertiser product interest categories, at what times). Digital purchase history 216 plus brick and mortar purchases bought with electronic wallet (eWallet) credentials help corroborate additional product interest information on behalf of the SSO subscriber by tracking purchase data for the SSO subscriber. SSO subscriber digital purchase history information keeps track of on-line purchases and purchases at retail outlets when an associated electronic wallet capability is used (eWallet).

SSO subscriber location is based on wireless networks (WiFi, WiMAX) or the fact the SSO subscriber is located at home using high-speed Internet access assists advertisers in determining how receptive the SSO subscriber might be to their advertisement/product at that time. The more receptive SSO subscriber is given a greater weight in their product interest correlation score.

An illustrative embodiment TAMS 108 aggregates data from multiple sources to provide a centralized storage for the TASS regarding determining the appropriate advertisements to target an SSO subscriber at a specific time. An illustrative TAMS 108 includes the TASS 212. Inputs to the TASS 212 include an Internet profiling database 204 which supplies the surfing and content consumption history for the SSO subscriber across multiple end user devices, multiple platforms and multiple networks; an advertiser index database 220 which maintains substantially all advertising related information including what advertisements have been sold, along with digital versions of various IP-based advertisements; a purchase history 216 for the SSO subscriber that includes purchases made electronically online, plus and brick and mortar retail purchases that may be able to be tracked to the SSO subscriber via the SSO subscriber's use of the electronic wallet (eWallet) that are tied to his SSO subscriber sign-on identity. SSO subscriber advertising profile settings 209 provide the SSO subscriber the chance to define privacy settings by opt ins or by other privacy control settings on their internet browser, for example, with regard to what types of advertisements the SSO subscriber wants to receive, plus how much of the SSO subscriber's usage history can be monitored and used to drive the targeted advertising process; and a web spidering process 212 that provides more definitive information on what specific URI links within web sites convey about the surfing and purchase history for the SSO subscriber. SSO subscriber advertising profile settings can be used to define product interests, how much on-line usage information can be shared and with whom, and under what conditions an SSO subscriber wishes to receive an advertisement.

An advertiser index database is provided that assimilates, accesses, and stores data for advertising sales records including available slots (spots) for television advertisements, Internet advertisements, radio (audio) advertisements, and paper and digital yellow pages advertisements. The advertiser index database also stores information and data on registered advertisers and their advertisements including product category, various media versions of advertisements, auction prices for each media mode of delivery (audio, video, text), each end user device type, coupon offers, location based offers, and product interest correlation score threshold settings that define the conditions for which specific advertisements should be delivered to a specific SSO subscriber having a certain PICS.

A particular illustrative embodiment of a TAMS provides targeted advertising using multiple media or data types (e.g., video, HTML and associated browser plug-ins like flash, image, icon, audio, text). SSO subscribers can input product interest criteria including shopping list, product or service category, advertisement delivery scheduling deadline, and desired delivery end user device (e.g., cell phone, PC, IP-based television service, mobile IP device). An interactive and/or dynamic web based interface (e.g., XML) to advertisers is provided to enable advertisers to dynamically in real time update advertising offers, auction prices, and threshold settings data for determining when an advertisement in a given product category should be delivered to a particular SSO subscriber. This data is stored in the SSO subscriber advertising profile and advertiser detail information 218.

Independent of the specific dynamic process of keeping the PICSs in a product interest correlation scoring matrix including but not limited to advertising categories and product interest correlation scores for the advertising categories. The product correlation scoring matrix is updated dynamically for each SSO subscriber in real time by the TASS 212, the spidering process 214 can occasionally be run as a supporting process, scanning the Internet (similar to search engine engines) and classifying web links based on implied intent of SSO subscribers visiting the page. Rather than indexing for search, in an illustrative embodiment the spidering process provides the TAMS with categorization information. For example, at a particular time the URI of http://www.buya-toyota.com/zipCodeEntry.aspx?zip_Code=78726&series_code=25&series_name=&model code=&s_van=GM_STN_FLS can be logged in the web spidering results database and used to ascertain that anyone accessing this link is not only interested in a particular car model, but actually was serious enough to inquire about local dealers and associated offers in their area. This can be determined by the spidering system employing a combination of indexing and natural language parsing and processing of text the spidering system finds on the page. This spidering information can be used to create a high product interest correlation "contribution" score for Autos By Make Manufacturer Model as well as Autos By Style Sedans Midsize Manufacturer Model. When an SSO subscriber subsequently surfs to this link, the "contribution" score can be added to the SSO subscriber's current product interest correlation score for this particular category. It should be noted that such a detected interest would increase the product interest correlation scores at each leg of the tree for both paths for which the manufacturer's model is a terminal value.

In an illustrative embodiment, the components and processes defined herein as part of the illustrative system and method TAMS 108 are intended for processing in real time as events occur. The associated modules that support the TAMS 108 provides messaging to the TASS 212 interactively (e.g. via XML or a web services framework) so a product interest correlation scoring matrix can be updated for the SSO subscriber in real time. The product interest correlation scoring matrix contains data indicating a product interest correlation score for a number of products and categories.

A significant amount of product interest information for each SSO subscriber is obtained by the profiling process 230 that is capable of receiving SSO subscriber event data indicating SSO subscriber surfing history from independent network service providers, including wireless 3G cellular, DSL, cable modem, broadband fiber, and IPTV. In an illustrative embodiment the profiling process 230 employs a media controller that is capable of logging URIs visited within an SSO subscriber's web browser, and/or performing deep packet inspection when desired to ascertain specific content and/or services that are being consumed by an SSO subscriber over the Internet, and assesses packet flows to the SSO subscriber to gauge more specifically what types of activities are being performed (e.g., services of interest, specific services/applications run, duration, location, etc.). (Media controllers that perform flow based packet analysis, available from vendors like Caspian Networks, can be used for this purpose.)

Regardless of access network and device used, the profiling process 230 usually will be able to identify the SSO subscriber via SSO credentials, and then maintains a URI history log for the identified SSO subscriber. The SSO credentials can be defined and cached in the SSO end user device (e.g. television set top box, cell phone, PC, laptop, etc.) to avoid requiring the SSO subscriber to sign in each and every time the Internet or another data communications network is accessed with such a device. This would likely be managed by an HTML cookie or similar mechanism to "time out" the login credentials if desired for security purposes. Alternatively, unique identifying information obtained from the end user device (e.g. cellular phone number, MAC address, product serial number) may be used to infer SSO credentials. The profiling process 230 would typically reside in the IP network 106, specifically in the routing framework providing Internet access. The routing framework provides a centralized point to monitor and profile SSO subscriber surfing history, traffic characteristics, port usage, etc. with which to monitor activities by the SSO subscriber.

This information would only be used based on positive privacy allowance or opt-in settings 206 defined by the SSO subscriber allowing specific monitoring permissions. It is likely that profile SSO subscriber history data information may be obtained from disparate access networks, even those operated by independent network service providers, which may be combined to make a "complete view" (stored in a user profile) of SSO subscriber usage history across multiple end user devices and networks plausible. The internet profiling process 230 also includes the ability to accept data feeds (e.g. in XML or other suitable data format) from other network providers that summarize the SSO subscriber historical usage and Internet surfing information data obtained from profiling processes within their own independent network.

Example technologies that can used to facilitate the messaging to the TASS 101 to accomplish its correlation scoring procedure include but are not limited to extended markup language (XML), RDF, DAML and OIL. A total PICS is calculated by factoring in demonstrated levels of interest in a particular product category via a variety of usage patterns for an SSO subscriber. The magnitude of the correlation score stored in the PICS matrix accessible to the TASS 101 for one particular category for the SSO subscriber defines an SSO subscriber's interest level in a product or product category. In practice the final product interest correlation score is tallied by evaluating surfing habits, TV viewing habits, personal profiles expressing proactive product interest, phone calling logs/habits, content of other communications tasks like instant messaging (IM), electronic mail, video telephony, and previous purchases. Timing, frequency, and access of multiple unrelated pieces of information having some correlation to the category are all factored into computing the total correlation score for a category.

Figure 3:
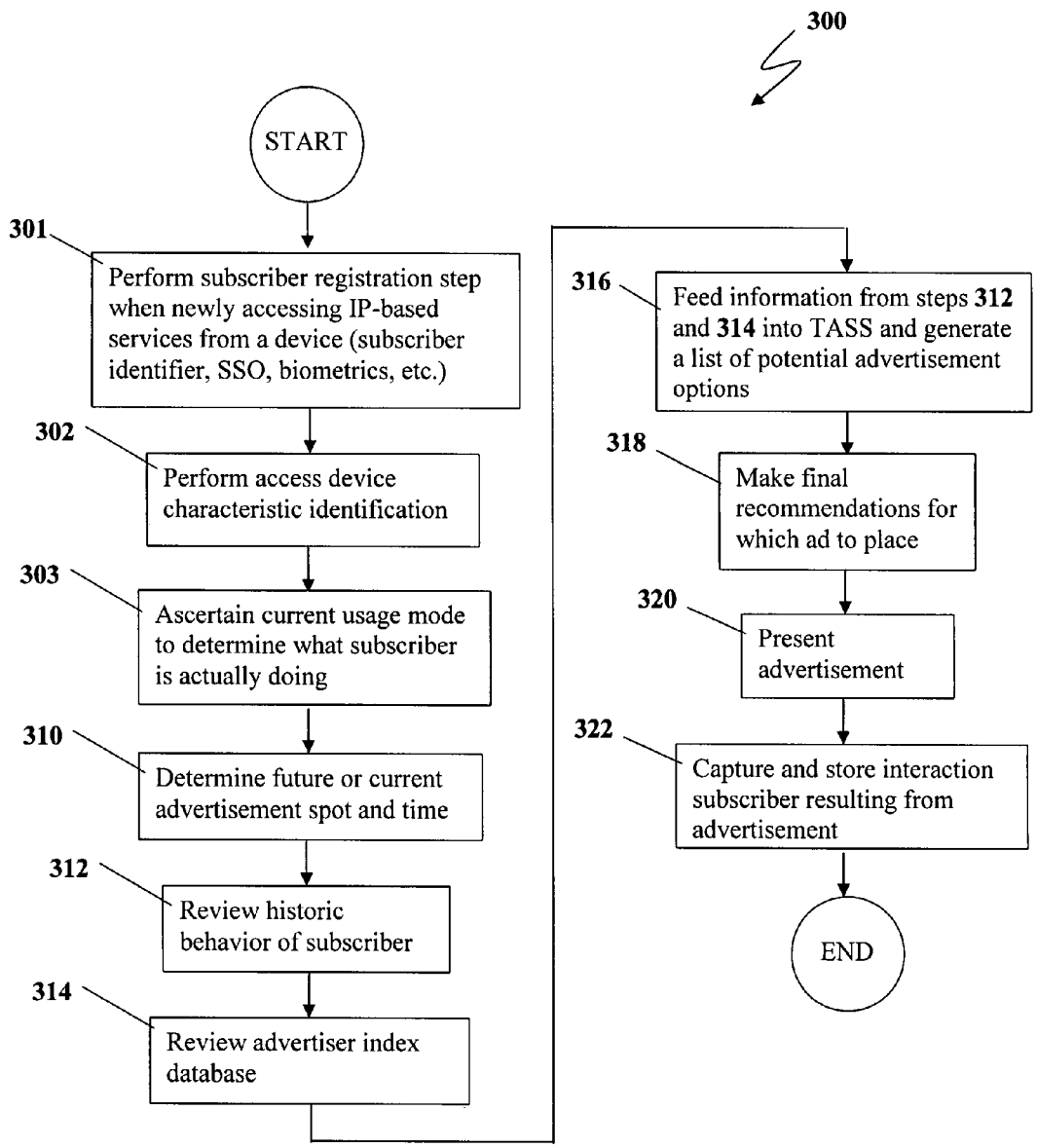
FIG. 3 is a flow chart of an illustrative embodiment of a method to determine which advertisement to select to send to an SSO subscriber at a particular opportunity or time.

FIG. 3 portrays the illustrative steps taken to select which advertisement to target/send to an SSO subscriber at a particular opportunity or time. First, an SSO subscriber registration step 301 is performed when initially accessing IP-based services from a device. An SSO subscriber registers (via an end user device) with the IP network. This registration prepares the IP network for an advertisement triggering the TAMS into standby mode. One example of registration automatically occurring is by an SSO subscriber turning on the IPTV service while at home. The IPTV network is able to ascertain the SSO subscriber identity, or if there is a family of SSO subscribers an easy method for delineation among family members can be supported by the IPTV set top box (STB) (e.g. typing in a 4-digit PIN for tracking SSO subscriber activity such as monitoring television channel changing behavior). Another way to identify an SSO subscriber is by SSO technology, where the SSO subscriber authenticates on a device with single sign-on (SSO) credentials, or the device uses cached SSO information to automatically logon and make the authentication implicit for the SSO subscriber.

Next, an end user device characteristic identification 302 occurs. This step determines whether the characteristics of the device currently being used by the SSO subscriber for Internet access are known. This may be validated by checking a medium access control (MAC) address or a database table which records previous end user devices used by the SSO subscriber, sorted by MAC address. If the SSO subscriber end user device characteristics are known, device parameters including screen resolution, audio/video capabilities, supported advertisement modes (e.g. TV advertisement, audio advertisement, web browser advertisement, MMS, SMS, phone call) are loaded. If device characteristics are not known, the process interrogates the SSO subscriber and/or end user device to obtain device characteristics from the SSO subscriber end user device, and these characteristics are then incorporated into a device database table in memory for future use.

After some time, an SSO subscriber begins to interact with IPTV network application or begins to consume content over the IPTV network. Details regarding the information/application being consumed are communicated to the TAMS 108. One example would be the SSO subscriber selecting "Travel Channel" to watch on the IPTV service. The channel is broadcasting a show on the ruins of Rome. This information is communicated to TAMS 108. At block 303 an illustrative embodiment determines what the SSO subscriber is actually doing at the moment, including but not limited to watching an IPTV stream, browsing the Internet, chatting, IM, talking on a cell phone, moving close to a advertiser location or perhaps doing nothing.

The TAMS 108 accesses the advertisement detail information and determines the future anticipated spot (and time) 310 for the advertisement—the commercial window in the content to place advertisements. Second, the TAMS reviews historic behavior 312 of the SSO subscriber relative to the subject—in this case traveling. For example, did the SSO subscriber recently shop for tickets or hotels on the web or via the phone? If so, did the shopping action consummate in a transaction? Does the SSO subscriber have frequent flyer miles? Has the SSO subscriber indicated preferences regarding receiving travel related promotions? What is the SSO subscriber's preference for dining and hotels and transportation? What is the likelihood of the SSO subscriber to consume complementary products? How large is the SSO subscriber's family? It should be noted that the review of historic behavior 312 is not limited to the SSO subscriber's current usage mode 303. The SSO subscriber's history of use may have resulted in a high advertising category score for something totally unrelated to the "Travel Channel," for which an advertiser is willing to pay an acceptable price for delivering the advertisement in a format that the SSO subscriber's current end user device characteristics 302 are best suited for. There also may be advertisements queued for delivery on such a device based on past usage modes 303.

Third, the TAMS reviews the advertiser index database 314 to determine whether there is any advertiser on the related subject, complementary subject, or even a product unrelated to the current SSO subscriber behavior that has an advertisement for a advertising category in which the SSO subscriber has a high product correlation score, who desires to send an advertisement to this SSO subscriber at this moment or at a later time. For example, are any airlines, hotels, restaurants, cruises, travel agents, etc. complementary to this subject? Is there an advertisement/promotion specifically for Rome? What is the advertiser's willingness (auction bid) to pay for the advertisement to be delivered, based on the PICS of the SSO subscriber for travel, specifically to Rome? Which advertiser is the highest bidder? Is there a high bidder who wants to deliver an advertisement well suited for the current end user device or suited for delivery at a later time, given there is a high product correlation score that gives the advertiser reason to believe the SSO subscriber may be interested in their product regardless of current subject inferred through SSO subscriber use? Fourth, information from steps two and three above are fed into the TASS 212 and the current product interest correlation score for the user (periodically updated by recent event data), advertiser bid prices and viable formats based on the device characteristics 302 are used to generate a list of potential advertisement 316 to be sent to an SSO subscriber either now or later. Note that this is not just matching the historic behavior 312 with the related advertising offers 314, but also associating other contextual information about the SSO subscriber (example, presence, location, etc.) and advertiser (example, ranking, advertiser auction bid, willingness to pay, etc.).

Such contextual information can include (but is not limited to) end user device capabilities, SSO subscriber's preference for style and format of an advertisement, advertiser's capabilities to deliver such an advertisement, SSO subscriber location, SSO subscriber advertising profile settings, PICS, and current usage scenario, etc. The current usage scenario for an SSO subscriber includes but is not limited to the activity in which an SSO subscriber is currently involved (including but not limited to web surfing, chatting, IM, web logging (blogging), telephone calls, etc.) the end user device being used (including but not limited to cell phone, PDA, laptop computer, personal computer, mobile IP devices, etc.) and location.

The TAMS 108 then selects 318 which advertisement from which advertiser to place and in which format to send the advertisement to the SSO subscriber end user device (and on which end user device) within the commercial spot (advertisement window) during the show or otherwise. This may involve sorting of the list, automated negotiation with advertisers in real time (or more likely a software agent defining bid rules and criteria for approving the sale of the advertisement) to dynamically negotiate auction bids for one advertiser or between two competing advertisers bidding against each other, etc.

The advertisement is then presented 320. The advertisement is rendered within the IP stream at the local, regional or central content delivery end in the IP network. Specific media format conversions are carried out and the final advertisement is generated and sent to a selected SSO subscriber end user device. Any interaction 322 resulting from the advertisement is captured and stored. Additional computations or fine tuning of the PICS (and associated list of advertisements) may be performed for the next commercial spot.

Figure 4:
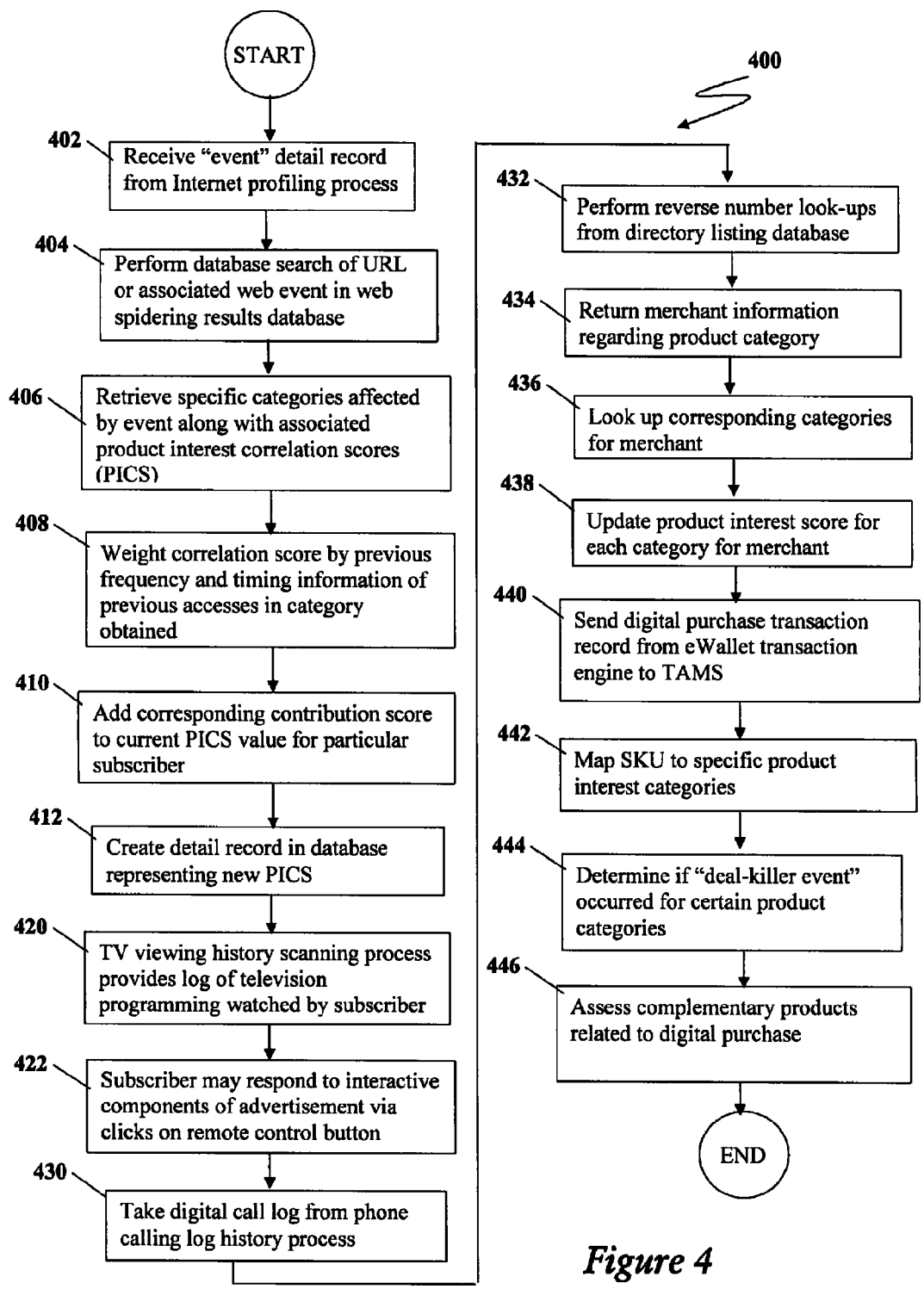
FIG. 4 is a flow chart showing an illustrative embodiment of a method of handling SSO subscriber event data and updating an SSO subscriber advertising profile in developing product interest correlation scores for the SSO subscriber.

FIG. 4 is a flow chart showing an illustrative embodiment of a method of handling SSO subscriber events and updating the TAMS with information which can assist in developing the product interest correlation scores for the SSO subscriber. Events include, but are not limited to, selecting a TV station, clicking on an interactive television advertisement, infomercial or menu selection option, browsing to a new web site, accessing or receiving via "push" technology information on the cellular telephone, sending electronic mails and instant messages, placing a standard telephone call.

In the case where the SSO subscriber accesses a web page, content, or an IP-based service from any end user device including personal computer (PC), IPTV set top box (STB), cell phone, etc. an event record detailing what the SSO subscriber accessed from their end user device is created. The TASS 101 receives an event detail record 402 containing data from the profiling process.

The TASS 212 then performs a database search 404 of the URI or associated event data in the spidering results database 214. If the URI or other event exists in the database, the specific advertising categories affected by the event are retrieved 406 along with their associated PICSs and updated in the product interest correlation score matrix for the SSO subscriber. Historic information regarding frequency and timing of previous accesses in this category is then obtained and used to "weight" a contribution score 408 accordingly. For each category in the PICS matrix, a corresponding contribution score is added to the current product interest score 410 for the particular SSO subscriber.

A detail record is then created in the TAMS database block 412 representing this new information. (Note: The detail records for a particular SSO subscriber and product or advertising category within the SSO subscriber's PICS matrix can be used to re-create the current PICS for that advertising category from scratch if desired.). This can be implemented via physical and virtual schemas or database views such as in RDBMS, XML databases or object oriented databases, taxonomies or semantic resource descriptions using XML or RDF.

In the case where there is a television viewing event, the TV viewing history scanning process sends data representing a log of all television programming watched by the viewer 420, including commercials for which the SSO subscriber may have responded to interactive components of the advertisement via clicks on the remote control 422 button. Similarly, data indicating commercials that were paused, rewound and viewed again, etc. can be sent to the TAMS 108. The television event includes, but is not limited to, watching a broadcast programming event and viewing a program stored on a digital video recorder.

In the case where a phone call has been placed, the phone calling log history process as part of the Internet profiling process 230 takes a digital call log 430 from a PSTN phone, cell phone, VoIP phone, or combination thereof and performs reverse number look-ups 432 from a directory listing database to ascertain what merchants may have been called. The merchant information is returned 434, which the TAMS 108 uses to look up the corresponding advertising categories 436 for the merchant, updating the product interest score 438 for each product interest or advertising category. Additionally, the communications history 238 may include other digital communication methods including IM, electronic mail, and video telephony/conferencing. Similar to the parsing and natural language processing techniques used by the web spidering process 214 to assess advertising category interest intent by the SSO subscriber, text from IM and electronic mail applications could similarly be parsed for product interest categorization. Categorization based on video telephony/conferencing could additionally employ speech recognition technology.

Advertising interest categories are essentially unlimited but may be represented by general categories including but not limited to sports, fashion, business, movies, etc. In the case of a digital purchase, a digital purchase transaction record is sent 440 from the eWallet transaction engine to the TAMS 108. In case where the cell phone or mobile subscription is used as a form of currency (or eWallet), such transaction associated with billing the SSO subscriber mobile account is also captured. The TAMS 108 can use stock keeping unit (SKU) number of product(s) purchased and map the SKU numbers to specific product interest advertising categories 442. The system then determines if this purchase represents a "deal-killer event" 444 for certain advertising categories. For example, if the item is not perceived to be a quickly perishable item and may impact future purchase opportunity in a specific category (e.g. customer finally buys the Toyota® Camry®) the PICS for that category within the SSO subscriber's matrix is reduced, if not zeroed out or blocked in its entirety for a period. Similarly, the system assesses whether there are complementary products 446 related to the digital purchase. Products known to be complementary to the purchase have product interest scores increased by a pre-defined "contribution" to the score.

It should be noted that any of preceding cases can be logged by the respective module, and transferred in bulk for handling by the TAMS 108 in batch mode on a scheduled basis also. In the more ideal dynamic mode for Internet profiling, for example, each URI visited or other event detected by the flow-based analysis process within the media controller would immediately send a message to the TAMS 108 so that the TAMS can treat each new piece of information or event in real-time and thus quickly provide an accurate product information scoring summary for the SSO subscriber in real time. Alternatively, some information may be obtained in non real time—examples include data feeds from third party access networks, or perhaps a transaction log from another service (e.g. phone calling log) that is not capable of providing information in real time.

Figure 5:
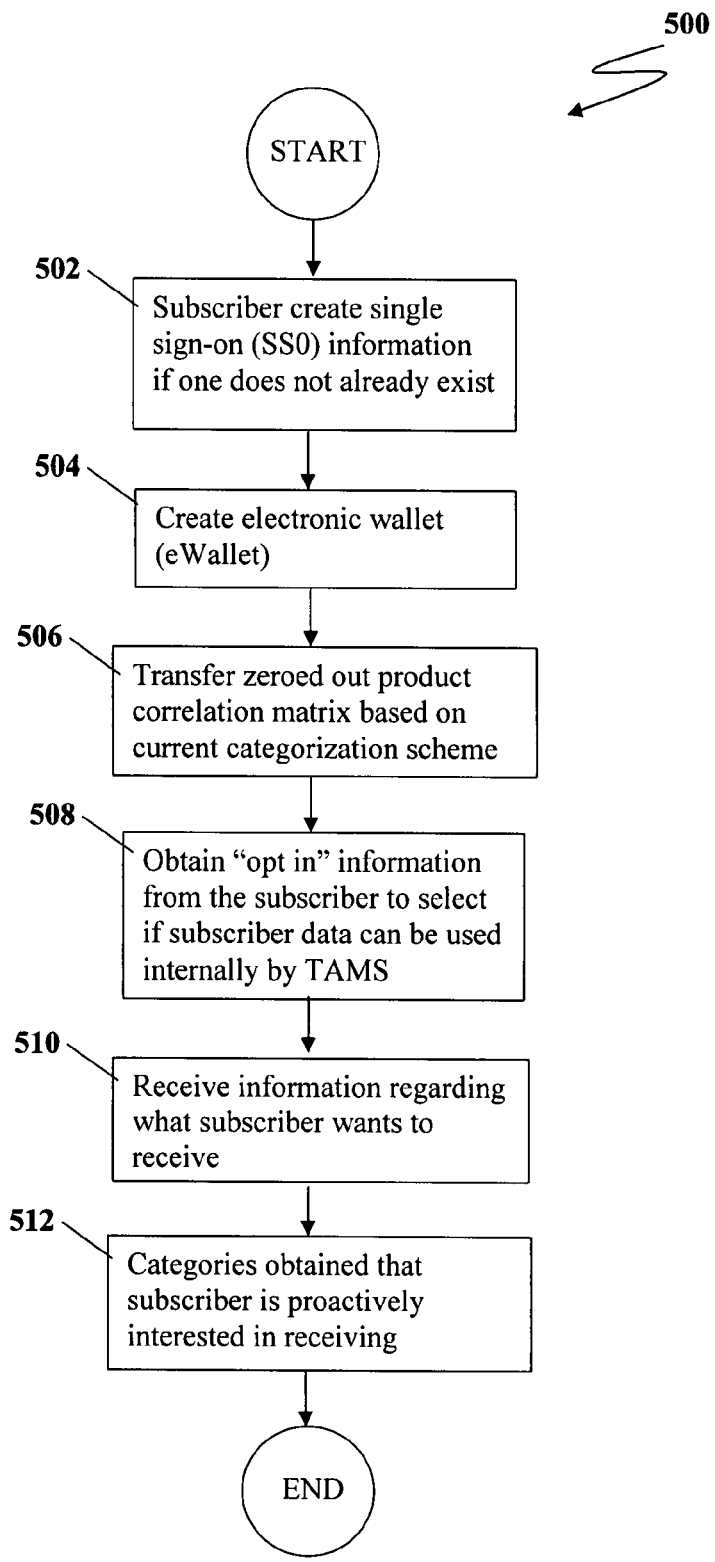
FIG. 5 is a flow chart showing an illustrative embodiment of a method of SSO subscriber enrollment, registering a new SSO subscriber of the IP-based services and advertising system.

FIG. 5 illustrates a method of SSO subscriber enrollment, i.e., handling a new SSO subscriber of the IP-based services and advertising system for this first time. The SSO subscriber first creates single sign on (SSO) information data 502 if one does not already exist, obtaining desired SSO subscriber ID and password with which to authenticate from all devices used henceforth. Next, an electronic wallet (eWallet) is created 504 for the SSO subscriber by obtaining online payment information and storing it in the SSO subscriber's profile. Alternately the eWallet is associated with the mobile subscription, in the case of the cellular subscription being used as a wallet. A zeroed out product correlation matrix is transferred 506 based on the current categorization scheme employed by the TASS 101.

The steps that follow encompass setting the SSO subscriber advertising profile settings; including obtaining what information the SSO subscribers are willing to have stored in the SSO subscriber advertising profile settings and used to help generate PICSc. It is important to note from a privacy perspective that none of this information about the SSO subscribers is shared with advertisers by default; rather the SSO subscriber advertising profiles are stored and used internally by the TAMS 100 to generate PICSs.

Obtaining "opt in" (privacy setting) information 508 lets the SSO subscriber enter data to select whether the event data can be used internally by the TAMS 100 to help in the SSO subscriber advertisement targeting process: e.g., phone calling log; Internet surfing log for specific devices; TV viewing history; interactive television clicks; electronic mail, IM, video telephony, application usage and digital purchase history. The SSO subscriber is also capable of changing opt in permissions for the TAMS to utilize any of the above information at any time, and even suspend its use temporarily if desired.

Obtaining what information the SSO subscriber wants to receive 510 allows SSO subscribers to create not only an approved "global" solicitation SSO subscriber advertising profile for advertisers, but can also customize advertising delivery methods based on advertising categories. SSO subscribers can thus personalize and select whether they wish to receive targeted TV advertisements, targeted Internet advertisements (banners in the browser, pop-ups, etc.) to their PC or laptop, text messages (SMS) and/or Multimedia messages (e.g. MMS) to their cell phone, electronic mail messages, audio recordings sent via a computer telephony system to the SSO subscriber's phone, direct contact, and U.S. mail and electronic coupon offers.

Obtaining a listing of categories and advertising categories in which the SSO subscriber is proactively interested in receiving information on 512 lets SSO subscriber select categories of interest for which they would like to be solicited with targeted advertisements and coupon offers. SSO subscribers can always update their proactive advertising category interests subsequent to this initial enrollment.

Figure 6:
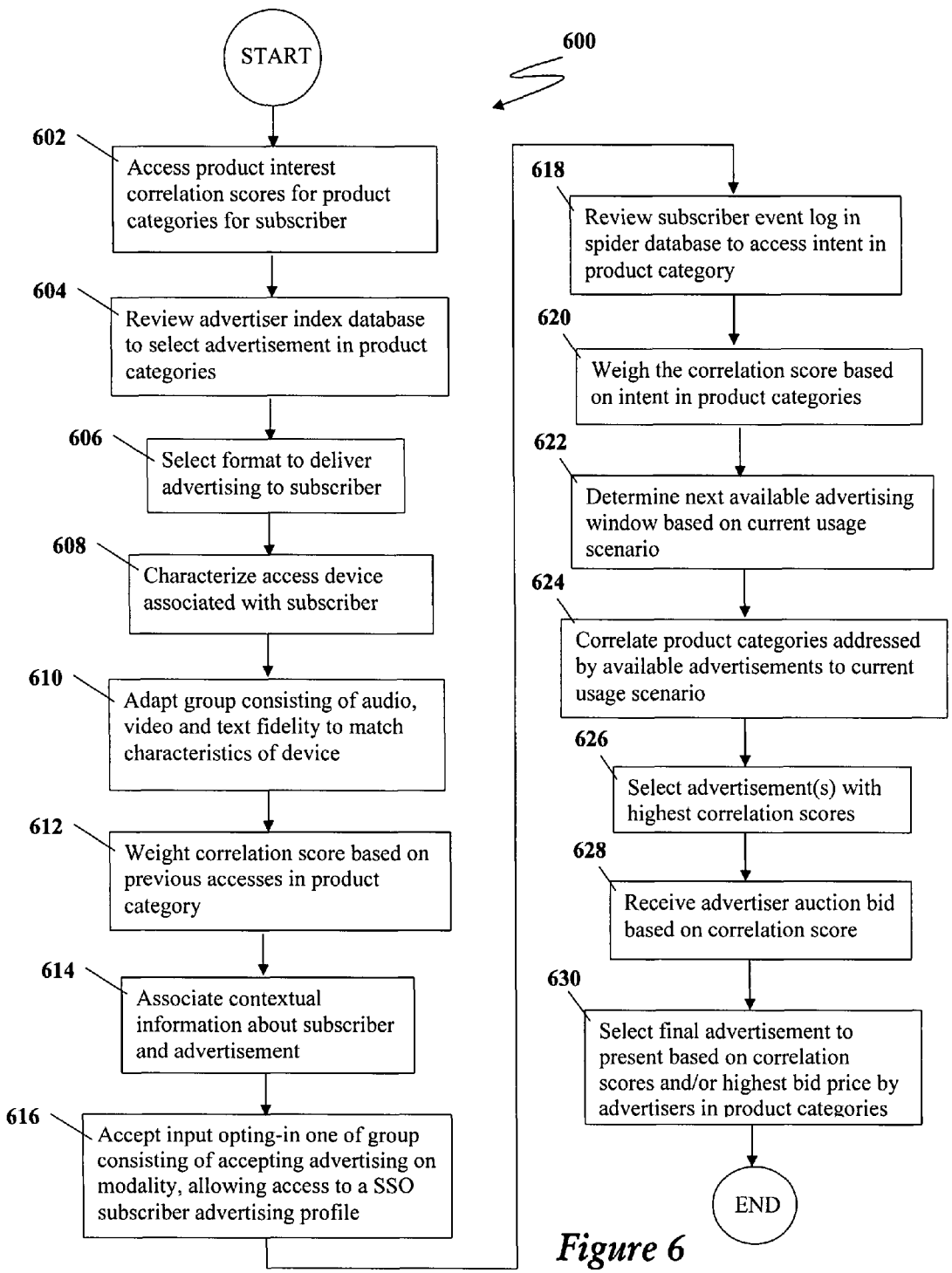
FIG. 6 is a flow chart showing an illustrative embodiment of a method for selecting an advertisement to send to an SSO subscriber.

Turning now to FIG. 6, FIG. 6 is a flow chart of an illustrative embodiment where PICSs 602 are retrieved for an advertising category for an SSO subscriber. The correlation score is already calculated and is updated periodically in real time as event data is monitored and the Internet profiling process has been occurring. An advertiser index database 604 is reviewed to select an advertisement in the respective advertising categories. Format 606 is selected to deliver advertising to the SSO subscriber, based on advertiser attributes that define willingness to pay for certain delivery modes based on the SSO subscriber's correlation score for the advertising categories. SSO end user device 608 is characterized as associated with the SSO subscriber. Audio, video and text fidelity 610 are adapted to match characteristics of the SSO subscriber end user device. Product interest correlation score 612 is weighted based on previous accesses, and how recently and the frequency of the accesses in the advertising categories by the SSO subscriber. Contextual information 614 about SSO subscriber and advertisement is associated. SSO subscriber input for opting-in one of the groups is accepted consisting of accepting advertising on end user device or modality and allowing access to a profile. The SSO subscriber's event log in the spidering database is then reviewed 618 to assess intent in advertising categories from the URI access. The PICS 620 of the SSO subscriber is weighted based on intent in the advertising category.

The next available advertising window 622 is determined based on an SSO subscriber's current usage scenario. Advertising categories addressed by available advertisements 624 are correlated to current usage scenario. Multiple advertiser auction bids 628 can be received based on the PICS. Advertisements 626 are selected with highest correlation scores matching the SSO subscriber's product interest correlation score. The correlation score for the advertisement is based on a comparison of the advertising category for the advertisement and the PICS for the SSO subscriber. Finally, the final advertisement to present is selected 630 based on correlation scores and/or highest bid price by advertisers.

Figure 7:
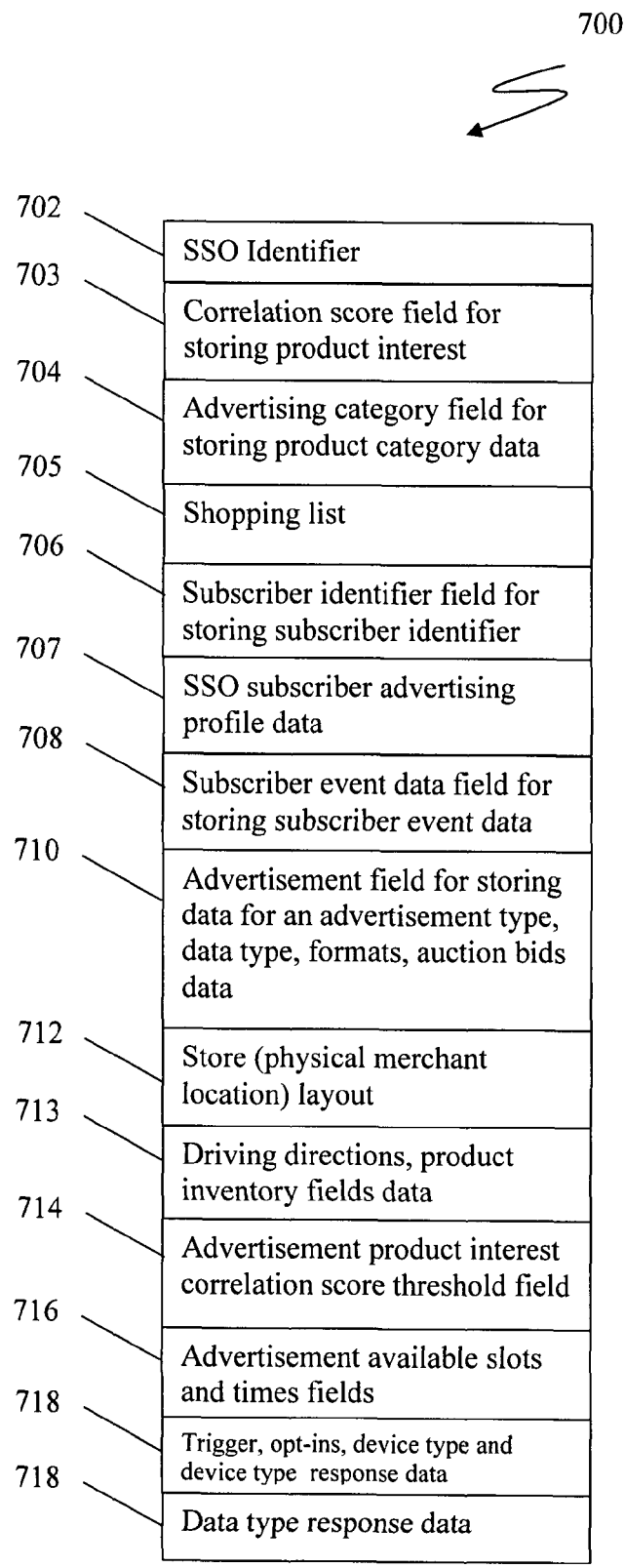
FIG. 7 is a schematic diagram of a data structure embedded in a computer readable medium in an illustrative embodiment.

Turning now to FIG. 7, FIG. 7 illustrates a data structure embedded in a machine or computer readable medium or memory for storing targeted advertising data intended for an SOS subscriber in the memory. An SSO identifier filed is provided to store an SSO identifier for a network SSO subscriber having multiple SSO subscriber identifiers for use in multiple networks and multiple platforms. A SSO identifier field is provided in the data structure for storing SSO identifier data 702. An associated correlation score field is provided in the data structure for storing product interest correlation score data 703. An advertising category field is provided for storing advertising category data and product category data 704. A shopping list field is provided for storing shopping list data 705. An SSO subscriber identifier field is provided for storing SSO subscriber identifier data 706. A SSO subscriber advertising profile field is provided for storing SSO subscriber advertising profile data 707. An SSO subscriber event data field is provided for storing SSO subscriber event data 708 for determining an SSO subscriber's advertising interest correlation score in an advertising category.

An advertisement field is provided for storing data for an advertisement 710, including but not limited to related advertising category type data response tendency; advertisement format data and auction bids data. A location filed 712 is provide for containing data indicating an SSO end user device location and a store (a physical merchant location) layout data for the location. A driving directions field and a product inventory field are provided for storing driving directions and product inventory data 713 for the store in the location. Advertisement product interest correlation score threshold data is stored in a provided product correlation interest score field 714. Advertisement available slots and times data are stored in the data structure in a provided advertisement available field 716. Trigger, opt-ins, advertising category interest, distance and location are stored in trigger and opt-in fields and device type 718. A trigger can be set to send an advertisement to SSO subscribers having a product interest correlation score greater than a product interest correlation score threshold and within a given distance from a specified location. A data type response data field is provided for storing data type response data 719 indicating an SSO subscriber's tendency to respond to a particular advertising data type.

Figure 8:
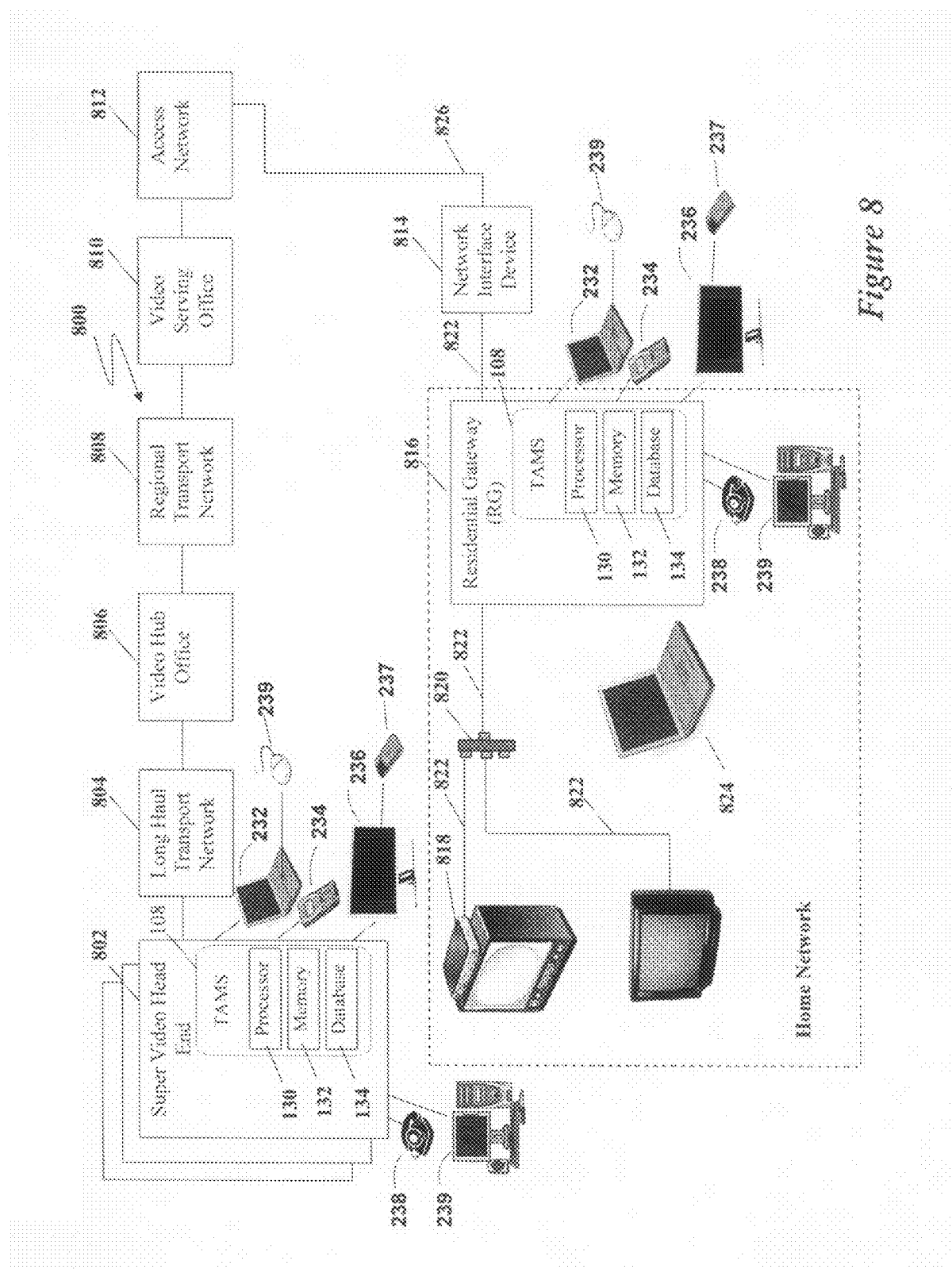
FIG. 8 is a schematic diagram of an illustrative embodiment showing an targeted advertising management system (TAMS) in an internet protocol television (IPTV) system.

Turning now to FIG. 8, FIG. 8 is a schematic diagram of an illustrative embodiment showing a TAMS in an IPTV system. As shown in FIG. 8, in an illustrative embodiment, the TAMS 108 may be associated or contained in a super video head end 802, a residential gateway 816 or a set top box 818. As shown in FIG. 8, the super video head end 802 (e.g., satellite ground station that receives channels via satellite and encodes for distribution over IP network) relays a video and data signal to a long haul transport network 804 (e.g. Gigabit Ethernet). The processor that hosts or is associated with the TAMS also monitors subscriber event data inputs associated with the SSO subscriber end user devices.

The SSO subscriber event data is monitored by the TAMS 108. As discussed above, event data may be collected from SSO subscriber communications as an SSO subscriber uses an SSO subscriber end user device (or inputting files created by a service provided based on SSO subscriber verbal or text input), including creating an SSO subscriber advertising profile, or various other activities discussed above, including but not limited to using an SSO subscriber end user device which may include but is not limited to a PSTN telephone 238, cell phone 234, personal computer 239, PDA, computer mouse 239, or IPTV receiver 236 and input device, such as a remote control 237, web tablet, lap top computer, pocket PC, and mobile IP device. The TAMS includes a processor 130 coupled to memory 132 and database 134 in memory. A computer readable medium containing instructions that can be executed by the processor is embedded in the memory.

The long haul transport network 804 relays the video and data signal to the video hub office 806 (e.g., metro office that receives video and data from super video head end (HE) and inserts local channels). The video hub office 806 relays the signal to the regional transport network 808 (e.g. Gigabit Ethernet). The regional transport network 808 relays the signal to the video serving office 810 (e.g. Telco Central Office delivering voice, data, and video to neighborhoods via Gigabit Ethernet links). The video serving office 810 relays the signal to the access network 812 (e.g. fiber to the Home Network, fiber to the Node Network with very high data rate video subscriber line (VDSL) delivery to the home). The access network 812 relays the signal via a fiber optic link (if fiber to the home (FTTH) is used to carry the video and data) or telephone wiring (if fiber to the node (FTTN) is used to carry the video and data) 826 to the network interface device (NID) 814.

The NID 814 relays the signal via the coaxial cable 822 to a gateway such as a residential gateway (RG) 816. The TAMS includes a processor 130 coupled to memory 132 and database 134 in memory. A computer readable medium containing instructions that can be executed by the processor is embedded in the memory. From the RG 816 the signal is relayed via the coaxial cable 822 to the coaxial splitter 820, which splits the signal via coaxial cables 822 to an STB 818, and other television sets on the home network. The signal can also be sent to laptop computers 824. The above example is for illustration only and can be implemented in numerous different ways in an IPTV system.

Figure 9:
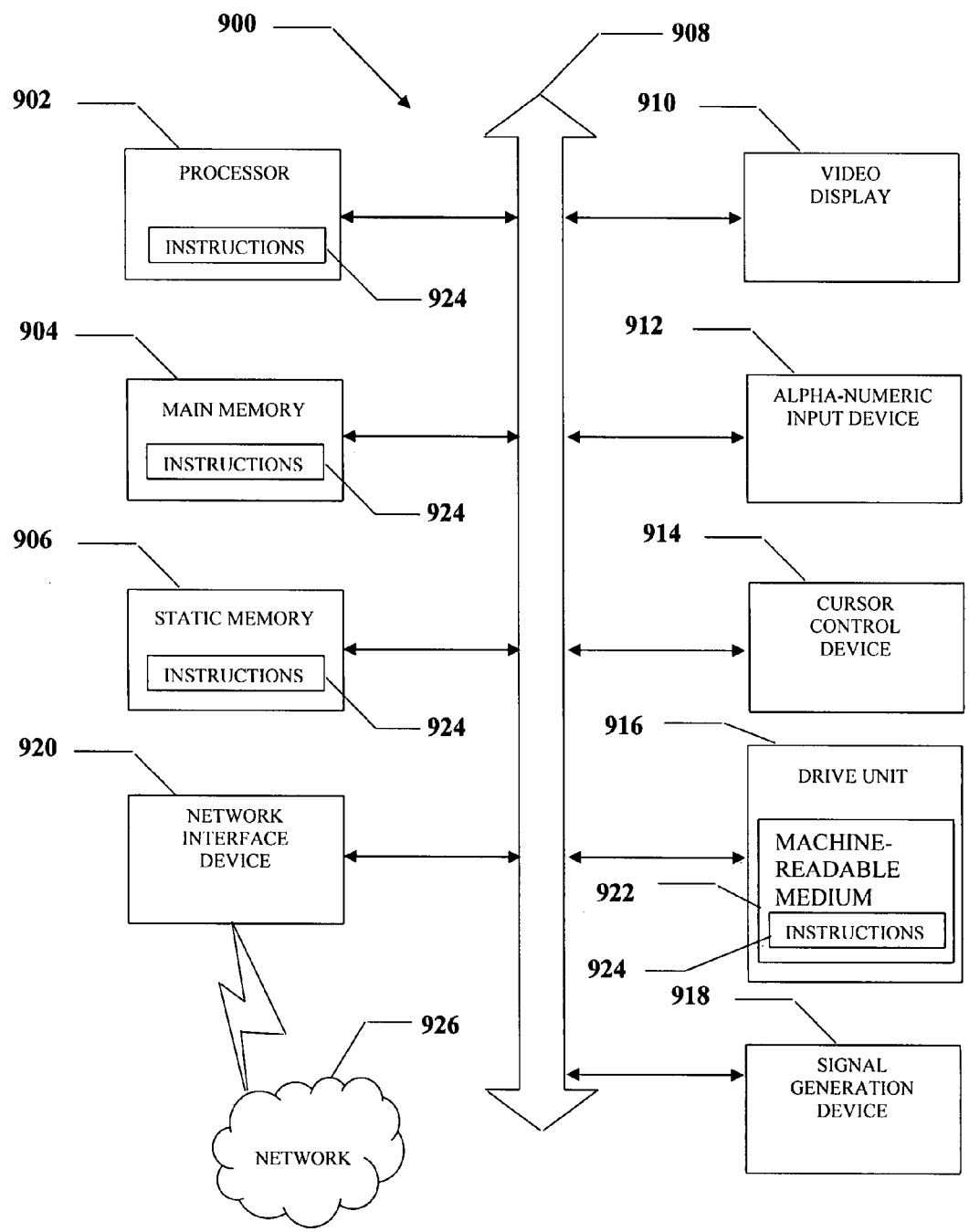
FIG. 9 is a diagrammatic representation of a machine in the form of a computer system within which a set of instructions, when executed, may cause the machine to perform any one or more of the methodologies of the illustrative embodiment.

FIG. 9 is a diagrammatic representation of a machine in the form of a computer system 900 within which a set of instructions, when executed, may cause the machine to perform any one or more of the methodologies discussed herein. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment. The machine may comprise a server computer, a client user computer, a personal computer (PC), a tablet PC, a set-top box (STB), a Personal Digital Assistant (PDA), a cellular telephone, a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any machine capable of executing a set of instructions (sequential or otherwise) that specify actions to be taken by that machine. It will be understood that a device of the present invention includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 900 may include a processor 902 (e.g., a central processing unit (CPU), a graphics processing unit (GPU), or both), a main memory 904 and a static memory 906, which communicate with each other via a bus 908. The computer system 900 may further include a video display unit 910 (e.g., liquid crystals display (LCD), a flat panel, a solid state display, or a cathode ray tube (CRT)). The computer system 200 may include an input device 912 (e.g., a keyboard), a cursor control device 914 (e.g., a mouse), a disk drive unit 916, a signal generation device 918 (e.g., a speaker or remote control) and a network interface.

The disk drive unit 916 may include a machine-readable medium 922 on which is stored one or more sets of instructions (e.g., software 924) embodying any one or more of the methodologies or functions described herein, including those methods illustrated in herein above. The instructions 924 may also reside, completely or at least partially, within the main memory 904, the static memory 906, and/or within the processor 902 during execution thereof by the computer system 900. The main memory 904 and the processor 902 also may constitute machine-readable media. Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present invention, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present illustrative embodiment contemplates a tangible machine readable medium containing instructions 924, or that which receives and executes instructions 924 transmitted or received over a network 926 via the network interface device 920. The machine readable medium may also contain a data structure for containing data useful in providing a functional relationship between the data and a machine or computer in an illustrative embodiment of the disclosed system and method.

While the machine-readable medium 922 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and/or a digital file attachment to e-mail or other self-contained information archive or set of archives is considered a distribution medium equivalent to a tangible storage medium. Accordingly, the invention is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the invention is not limited to such standards and protocols. Each of the standards for Internet and other packet switched network transmission (e.g., TCP/IP, UDP/IP, HTML, and HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived there from, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method for selecting targeted advertising data, the method comprising:

identifying by a processor at a server, a federated single sign on identity for a single sign on subscriber over a plurality of platforms and data communication networks;

monitoring by the processor each of a plurality of the single sign on subscriber's responses from a plurality of end user devices to each of a plurality of advertisements having a plurality of advertising data types in data communications networks, the federated single sign on identity to obtain single sign on subscriber response tendency data for a plurality of single sign on subscriber end user devices associated with the federated single sign on identity, wherein the response tendency data is based on a historical log of the plurality of responses end user devices indicating a tendency to respond to a particular data type, a particular advertising type and on a particular device type;

tracking by the server the plurality of the end user's responses to for different advertising data types comprising image, video, audio, text and icon, advertising data types presented to the end user device, wherein the advertising types comprising banner, pop-up, icon indicated for advertising data and end user device types comprising internet protocol television display, cell phone, personal computer and mobile to which the single sign on subscriber responds;

selecting a data type, advertising type and end user device type for targeted advertising data based on the tracked response tendency data and current location of the single sign on subscriber, wherein the tracked response tendency data indicates the single sign on subscriber's response tendencies for the single sign on identity to the different data types, advertising types for advertising data and end user device types to which the single sign on subscriber responds; and sending from the server to a particular end user device type associated with the single sign on subscriber, targeted advertising data having a data type selected from the group consisting of image, video, audio, text and icon, wherein the data type and device type are selected based on the single sign on end user data type and end user device type response tendency data for the single sign on subscriber;

wherein in the response tendency data:

in response to the advertising data type is image, sending an image advertisement;

in response to the advertising data type is audio, sending an audio advertisement;

in response to the advertising data type is video, sending a video advertisement, wherein the plurality of data communications networks are selected from the group consisting of an internet protocol television network, a voice over internet protocol network, a internet service provider network and a cellular telephone network and wherein an advertising category is at least one of the group consisting of sports, fashion, business and movies and wherein the data type further comprises a data type selected from the group consisting of image, video, audio, text, icon, the advertising type further comprises an advertising type selected from the group consisting of icons and pop-ups and the end user device type further comprises an end user device type selected from the group consisting of an internet protocol television display, personal computer, and cellular telephone, wherein in the response tendency data:

in response to the advertisement type is banner, sending a banner advertisement;

in response to the advertisement type is pop-up, sending a pop-up advertisement; and in response to the advertisement type is icon, sending an icon advertisement;

and wherein the single sign on response tendency data is collected from a plurality of different platforms having different single sign on subscriber identifiers associated with the single sign on end user identifier.

2. The method of claim 1, wherein the single sign on subscriber end user device is selected from a cell phone, personal digital assistant (PDA), lap top computer, stationary personal computer, internet protocol television remote control, web tablet, laptop computer, pocket PC, a television set capable of receiving IP based video services and mobile IP device, wherein in the response tendency data:

in response to the end user device type is a television display, sending an advertisement to a television display;

in response to the end user device type is cell phone, sending an advertisement to a cell phone; and in response to the end user device type is a personal computer, sending an advertisement to a personal computer.

3. The method of claim 1, further comprising:

determining a characteristic for an single sign on subscriber end user device; and adapting an advertising data format for the single sign on subscriber end user device selected from at least one of the group consisting of audio, video, graphics support, and text fidelity to match the characteristic of the single sign on end user device.

4. The method of claim 1, wherein the end user device is selected based on the end user device response tendency data indicating an end user device type to which the single sign on subscriber tends to respond.

5. The method of claim 1, comprising sending the targeted advertising data having a data type selected from image, video, audio, text and icon, wherein the data type is selected based on an single sign on end user data type response tendency data from an single sign on subscriber advertising profile.

6. A system for selecting targeted advertising, the system comprising:

a processor in data communication with a tangible non-transitory computer readable storage medium; and a computer program stored in the tangible non-transitory computer readable storage medium for execution by the processor, the computer program comprising:

instructions to monitor a plurality of an end user's responses to different advertising data types comprising image, video, audio, text and icon, advertising data types presented to the end user device, wherein the advertising data types comprising banner, pop-up, icon indicated for advertising data and end user device types comprising internet protocol television display, cell phone, personal computer and mobile to which the single sign on subscriber responds;

instructions to track in a plurality of data communications networks, single sign on subscriber response tendency data, indicating the single sign on subscriber's prior tendency to respond to advertising data data type comprising video, audio, text and icon, advertising type comprising banner, pop-up and icon and end user device type comprising internet protocol display, cell phone, personal computer and mobile device; and instructions to select a data type, advertising type and end user device type for the targeted advertising data based on the single sign on response tendency data and current location of the single sign on subscriber, indicating which data type, advertising type and end user device to which the single sign on subscriber responds; and instructions to send to a particular end user device type associated with the single sign on subscriber, targeted advertising data having a data type selected from the group consisting of image, video, audio, text and icon, wherein the data type and device type are selected based on the single sign on end user data type and end user device type response tendency data for the single sign on subscriber; and instructions to determine a data type in the response tendency data, wherein in the response tendency data:

in response to the advertising data type is image, sending an image advertisement;

in response to the advertising data type is audio, sending an audio advertisement; and in response to the advertising data type is video, sending a video advertisement;

wherein the plurality of data communications networks are selected from the group consisting of an internet protocol television network, a voice over internet protocol network, a internet service provider network and a cellular telephone network and wherein an advertising category is one of the group consisting of sports, fashion, business and movies and wherein the data type further comprises a data type selected from the group consisting of image, video, audio, text, icon, the advertising type further comprises an advertising type selected from the group consisting of icons and pop-ups and the end user device type further comprises an end user device type selected from the group consisting of an internet protocol television display, personal computer, and cellular telephone, wherein in the response tendency data: p1 in response to the advertisement type is banner, sending a banner advertisement;

in response to the advertisement type is pop-up, sending a pop-up advertisement; and in response to the advertisement type is icon, sending an icon advertisement;

and wherein the single sign on response tendency data is collected from a plurality of different platforms having different single sign on subscriber identifiers associated with the single sign on end user identifier.

7. The system of claim 6, wherein the single sign on subscriber end user device is selected from the group consisting of a cell phone, personal digital assistant, lap top computer, stationary personal computer, internet protocol television remote control, web tablet, laptop computer, pocket PC, a television set capable of receiving IP based video services and mobile IP device;

instructions to determine an end user device type in the response tendency data, wherein in the response tendency data:

in response to the end user device type is a television display, send an advertisement to a television display;

in response to the end user device type is cell phone, send an advertisement to a cell phone; and in response to the end user device type is a personal computer, send an advertisement to a personal computer.

8. The system of claim 6, the computer program further comprising instructions to determine a characteristic for an single sign on subscriber end user device and instructions to adapt an advertising data format for the single sign on subscriber end user device to one of audio, video, graphics support, and text fidelity to match the characteristic of the single sign on end user device.

9. The system of claim 6, the computer program further comprising instructions to send targeted advertising data having a data type selected from image, video, audio, text and icon, wherein the data type is selected based on an single sign on end user data type response tendency data from the single sign on subscriber advertising profile.

10. A tangible non-transitory computer readable storage medium containing a computer program, the computer program comprising instructions that when executed by a processor cause the processor to perform a function, the computer program further comprising:

instructions to monitor a plurality of an end user's responses to different advertising data types comprising image, video, audio, text and icon, advertising data types presented to the end user device, wherein the advertising data types comprise banner, pop-up, icon indicated for advertising data and end user device types comprising internet protocol television display, cell phone, personal computer and mobile to which the single sign on subscriber responds;

instructions to track in a plurality of data communications networks, single sign on subscriber response tendency data;

instructions to select advertising data based on the single sign on response tendency data, wherein the single sign on response tendency data indicates data type comprising image, video, audio, text and icon, advertising type comprising banner, pop-up and icon indicated and end user device type comprising internet protocol television display, cell phone, personal computer and mobile device for advertising data to which an single sign on subscriber responds;

instructions to determine a data tune in the response tendency data, wherein in the response tendency data:

in response to the advertising data type is image, sending an image advertisement;

in response to the advertising data type is audio, sending an audio advertisement; and in response to the advertising data type is video, sending a video advertisement;

wherein the plurality of data communications networks are selected from the group consisting of an internet protocol television network, a voice over internet protocol network, a internet service provider network and a cellular telephone network and wherein an advertising category is one of the group consisting of sports, fashion, business and movies and wherein the data type further comprises a data type selected from the group consisting of image, video, audio, text, icon, the advertising type further comprises an advertising type selected from the group consisting of icons and pop-ups and the end user device type further comprises an end user device type selected from the group consisting of an internet protocol television display, personal computer, and cellular telephone, wherein in the response tendency data:

in response to the advertisement type is banner, sending a banner advertisement;

in response to the advertisement type is pop-up, sending a pop-up advertisement; and in response to the advertisement type is icon, sending an icon advertisement, and wherein the single sign on response tendency data is collected from a plurality of different platforms having different single sign on subscriber identifiers associated with the single sign on end user identifier.

* * * * *